US012720527B2

(12) United States Patent
Liu et al.

(10) Patent No.: US 12,720,527 B2
(45) Date of Patent: Aug. 25, 2026

(54) PHYSICAL SIDELINK FEEDBACK CHANNEL TRANSMISSIONS

(71) Applicant: QUALCOMM Incorporated, San Diego, CA (US)

(72) Inventors: Chih-Hao Liu, San Diego, CA (US); Jing Sun, San Diego, CA (US); Giovanni Chisci, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 18/361,403

(22) Filed: Jul. 28, 2023

(65) Prior Publication Data

US 2025/0039865 A1 Jan. 30, 2025

(51) Int. Cl.
*H04W 72/00* (2023.01)
*H04L 1/00* (2006.01)
*H04L 1/1812* (2023.01)
*H04W 72/1263* (2023.01)

(52) U.S. Cl.
CPC ....... *H04W 72/1263* (2013.01); *H04L 1/0008* (2013.01); *H04L 1/1812* (2013.01)

(58) Field of Classification Search
None
See application file for complete search history.

(56) References Cited

U.S. PATENT DOCUMENTS

2022/0094480 A1* 3/2022 Huang .................. H04L 1/1621
2023/0269056 A1* 8/2023 Si .......................... H04W 76/14 370/329
2025/0219770 A1* 7/2025 Liu ....................... H04L 1/1854
2025/0261215 A1* 8/2025 Lin ....................... H04W 72/25

FOREIGN PATENT DOCUMENTS

CN 119485768 A * 2/2025 ........... H04L 5/0053
WO WO-2024073987 A1 * 4/2024 ........... H04L 1/1896

OTHER PUBLICATIONS

Partial International Search Report—PCT/US2024/034700—ISA/EPO—Oct. 15, 2024.

(Continued)

*Primary Examiner* — Brandon M Renner
(74) *Attorney, Agent, or Firm* — Harrity & Harrity, LLP

(57) ABSTRACT

Various aspects of the present disclosure generally relate to wireless communication. Some aspects more specifically relate to sidelink communications and physical sidelink feedback channel (PSFCH) transmissions. A channel occupancy time (COT) initiating user equipment (UE) may obtain PSFCH information that indicates a plurality of PSFCH transmission occasions. The COT initiating UE may transmit a sidelink communication to a responding UE. In some aspects, the COT initiating UE may receive, from the responding UE, hybrid automatic repeat request (HARQ) feedback in each PSFCH transmission occasion of the plurality of PSFCH transmission occasions. In some other aspects, the COT initiating UE may receive, from the responding UE, HARQ feedback in at least the first PSFCH transmission occasion of the plurality of PSFCH transmission occasions.

30 Claims, 15 Drawing Sheets

(56) References Cited

OTHER PUBLICATIONS

Xiaomi: "Discussion on Physical Channel Design for Sidelink-Unlicensed", 3GPP TSG RAN WG1 #113, R1-2304903, 3rd Generation Partnership Project, Mobile Competence Centre, 650, Route Des Lucioles, F-06921 Sophia-Antipolis Cedex, France, vol. 3GPP RAN 1, No. Incheon, Korea, May 22, 2023-May 26, 2023, May 15, 2023, 11 Pages, XP052385374, p. 5.
Apple: "Sidelink Physical Channel Design Framework for Unlicensed Spectrum", 3GPP TSG RAN WG1 #113, R1-2305244, 3rd Generation Partnership Project, Mobile Competence Centre, 650, Route Des Lucioles, F-06921 Sophia-Antipolis Cedex, France, vol. 3GPP RAN 1, No. Incheon, Korea, May 22, 2023-May 26, 2023, May 15, 2023, 24 Pages, XP052385645, p. 15.
Apple: "On Sidelink Physical Channel Design Framework for Unlicensed Spectrum", 3GPP TSG RAN WG1 #112bis-e, R1-2303485, 3rd Generation Partnership Project, Mobile Competence Centre, 650, Route Des Lucioles, F-06921 Sophia-Antipolis Cedex, France, vol. 3GPP RAN 1, No. e-Meeting, Apr. 17, 2023-Apr. 26, 2023, Apr. 7, 2023, 26 Pages, XP052352945, p. 16.
Interdigital Inc: "SL U Physical Layer Design Framework", 3GPP TSG RAN WG1 #113, R1-2305153, 3rd Generation Partnership Project, Mobile Competence Centre, 650, Route Des Lucioles, F-06921 Sophia-Antipolis Cedex, France, vol. 3GPP RAN 1, No. Incheon, Korea, May 22, 2023-May 26, 2023, May 21, 2023, 27 Pages, XP052394103, p. 7.
International Search Report and Written Opinion—PCT/US2024/034700—ISA/EPO—Dec. 23, 2024.
Vivo: "Physical Channel Design Framework for Sidelink on Unlicensed Spectrum", 3GPP TSG RAN WG1 #113, R1-2304481, 3rd Generation Partnership Project, Mobile Competence Centre, 650, Route Des Lucioles, F-06921 Sophia-Antipolis Cedex, France, vol. 3GPP RAN 1, No. Incheon, Korea, May 22, 2023-May 26, 2023, May 15, 2023, 26 Pages, XP052385023, p. 14.

* cited by examiner

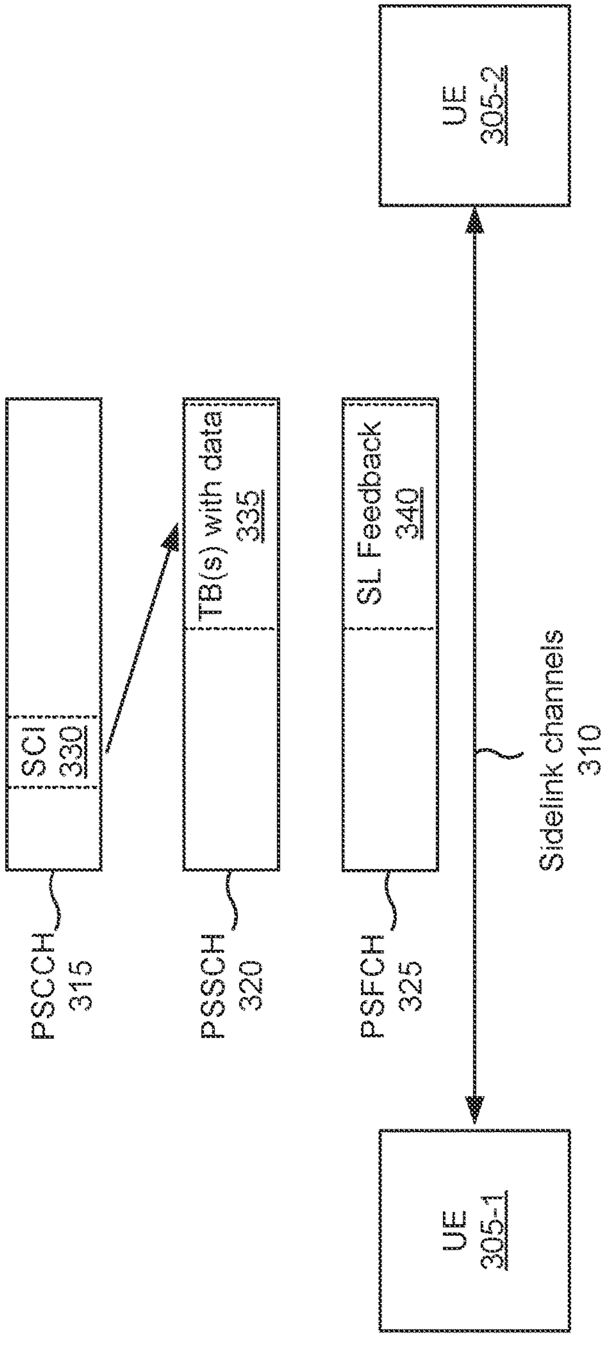
FIGURE 3

400

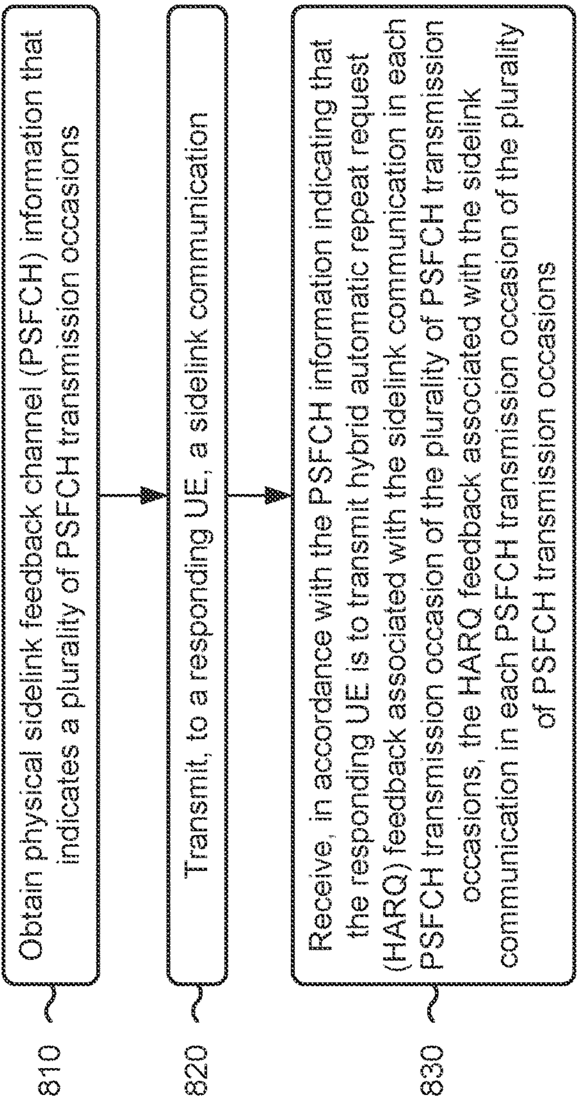
800
810
Obtain physical sidelink feedback channel (PSFCH) information that indicates a plurality of PSFCH transmission occasions
820
Transmit, to a responding UE, a sidelink communication
830
Receive, in accordance with the PSFCH information indicating that the responding UE is to transmit hybrid automatic repeat request (HARQ) feedback associated with the sidelink communication in each PSFCH transmission occasion of the plurality of PSFCH transmission occasions, the HARQ feedback associated with the sidelink communication in each PSFCH transmission occasion of the plurality of PSFCH transmission occasions

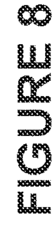
FIGURE 8

900
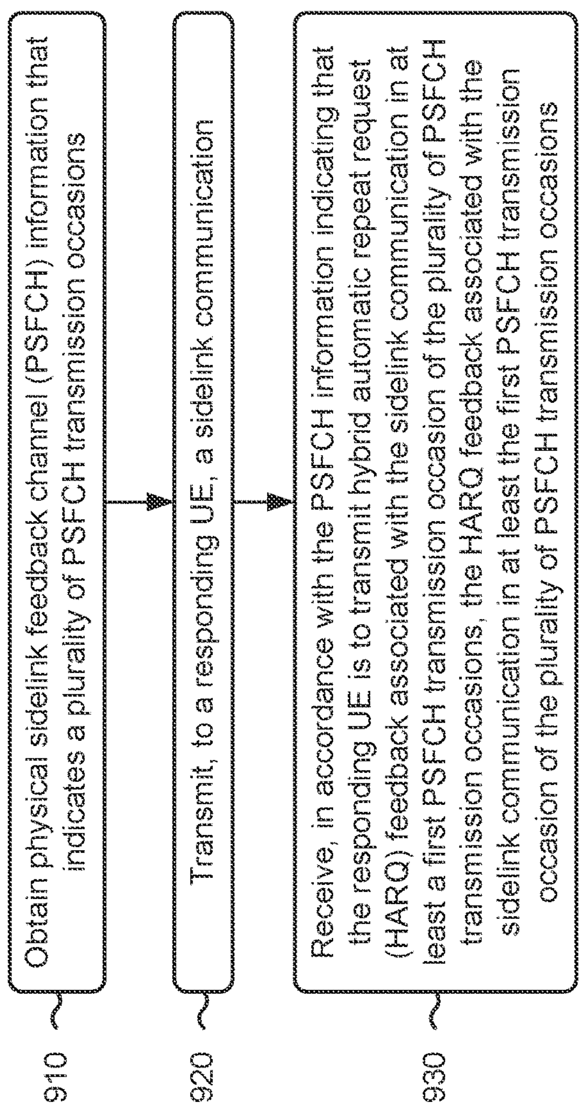
FIGURE 9

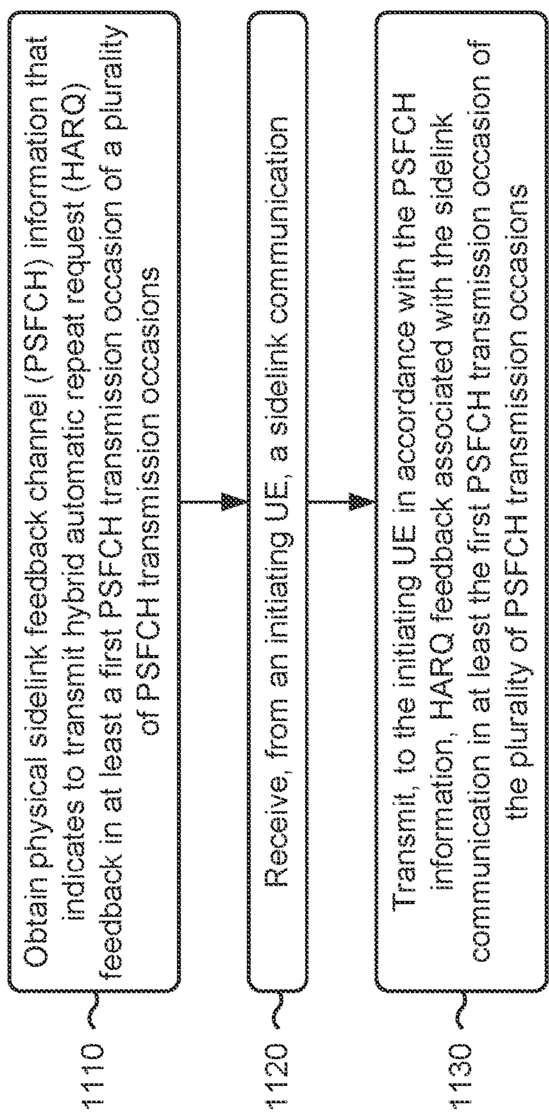
FIGURE 11

PHYSICAL SIDELINK FEEDBACK CHANNEL TRANSMISSIONS

FIELD OF THE DISCLOSURE

Aspects of the present disclosure generally relate to wireless communication and specifically, to techniques and apparatuses for physical sidelink feedback channel transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed at an initiating user equipment (UE). The method may include obtaining physical sidelink feedback channel (PSFCH) information that indicates a plurality of PSFCH transmission occasions. The method may include transmitting, to a responding UE, a sidelink communication. The method may include receiving, in accordance with the PSFCH information indicating that the responding UE is to transmit hybrid automatic repeat request (HARQ) feedback associated with the sidelink communication in each PSFCH transmission occasion of the plurality of PSFCH transmission occasions, the HARQ feedback associated with the sidelink communication in each PSFCH transmission occasion of the plurality of PSFCH transmission occasions.

Some aspects described herein relate to a method of wireless communication performed at an initiating UE. The method may include obtaining PSFCH information that indicates a plurality of PSFCH transmission occasions. The method may include transmitting, to a responding UE, a sidelink communication. The method may include receiving, in accordance with the PSFCH information indicating that the responding UE is to transmit HARQ feedback associated with the sidelink communication in at least a first PSFCH transmission occasion of the plurality of PSFCH transmission occasions, the HARQ feedback associated with the sidelink communication in at least the first PSFCH transmission occasion of the plurality of PSFCH transmission occasions.

Some aspects described herein relate to a method of wireless communication performed at a responding UE. The method may include obtaining PSFCH information that indicates for transmission of HARQ feedback in each PSFCH transmission occasion of a plurality of PSFCH transmission occasions. The method may include receiving, from an initiating UE, a sidelink communication. The method may include transmitting, to the initiating UE in accordance with the PSFCH information, HARQ feedback associated with the sidelink communication in each PSFCH transmission occasion of the plurality of PSFCH transmission occasions.

Some aspects described herein relate to a method of wireless communication performed at a responding UE. The method may include obtaining PSFCH information that indicates for transmission of HARQ feedback in at least a first PSFCH transmission occasion of a plurality of PSFCH transmission occasions. The method may include receiving, from an initiating UE, a sidelink communication. The method may include transmitting, to the initiating UE in accordance with the PSFCH information, HARQ feedback associated with the sidelink communication in at least the first PSFCH transmission occasion of the plurality of PSFCH transmission occasions.

Some aspects described herein relate to an initiating UE for wireless communication. The initiating user equipment may include one or more memories storing processor readable code and one or more processors coupled with the one or more memories. At least one processor of the one or more processors may be configured to cause the initiating user equipment to obtain PSFCH information that indicates a plurality of PSFCH transmission occasions. At least one processor of the one or more processors may be configured to cause the initiating user equipment to transmit, to a responding UE, a sidelink communication. At least one processor of the one or more processors may be configured to cause the initiating user equipment to receive, in accordance with the PSFCH information indicating that the responding UE is to transmit HARQ feedback associated with the sidelink communication in each PSFCH transmission occasion of the plurality of PSFCH transmission occasions, the HARQ feedback associated with the sidelink communication in each PSFCH transmission occasion of the plurality of PSFCH transmission occasions.

Some aspects described herein relate to an initiating UE for wireless communication. The initiating user equipment may include one or more memories storing processor readable code and one or more processors coupled with the one or more memories. At least one processor of the one or more processors may be configured to cause the initiating user equipment to obtain PSFCH information that indicates a plurality of PSFCH transmission occasions. At least one processor of the one or more processors may be configured to transmit, to a responding UE, a sidelink communication. At least one processor of the one or more processors may be configured to cause the initiating user equipment to receive, in accordance with the PSFCH information indicating that the responding UE is to transmit HARQ feedback associated with the sidelink communication in at least a first PSFCH transmission occasion of the plurality of PSFCH transmission occasions, the HARQ feedback associated with the sidelink communication in at least the first PSFCH transmission occasion of the plurality of PSFCH transmission occasions.

Some aspects described herein relate to a responding UE for wireless communication. The responding user equipment may include one or more memories storing processor readable code and one or more processors coupled with the one or more memories. At least one processor of the one or more processors may be configured to obtain PSFCH information that indicates for transmission of HARQ feedback in each PSFCH transmission occasion of a plurality of PSFCH transmission occasions. At least one processor of the one or more processors may be configured to cause the responding user equipment to receive, from an initiating UE, a sidelink communication. At least one processor of the one or more processors may be configured to cause the responding user equipment to transmit, to the initiating UE in accordance with the PSFCH information, HARQ feedback associated with the sidelink communication in each PSFCH transmission occasion of the plurality of PSFCH transmission occasions.

Some aspects described herein relate to a responding UE for wireless communication. The responding user equipment may include one or more memories storing processor readable code and one or more processors coupled with the one or more memories. At least one processor of the one or more processors may be configured to obtain PSFCH information that indicates for transmission of HARQ feedback in at least a first PSFCH transmission occasion of a plurality of PSFCH transmission occasions. At least one processor of the one or more processors may be configured to cause the responding user equipment to receive, from an initiating UE, a sidelink communication. At least one processor of the one or more processors may be configured to cause the responding user equipment to transmit, to the initiating UE in accordance with the PSFCH information, HARQ feedback associated with the sidelink communication in at least the first PSFCH transmission occasion of the plurality of PSFCH transmission occasions.

Some aspects described herein relate to a non-transitory computer-readable medium that stores a set of instructions for wireless communication. The set of instructions may include one or more instructions that, when executed by an initiating UE, cause the initiating UE to obtain PSFCH information that indicates a plurality of PSFCH transmission occasions. The set of instructions may include one or more instructions that, when executed by an initiating UE, cause the initiating UE to transmit, to a responding UE, a sidelink communication. The set of instructions may include one or more instructions that, when executed by an initiating UE, cause the initiating UE to receive, in accordance with the PSFCH information indicating that the responding UE is to transmit HARQ feedback associated with the sidelink communication in each PSFCH transmission occasion of the plurality of PSFCH transmission occasions, the HARQ feedback associated with the sidelink communication in each PSFCH transmission occasion of the plurality of PSFCH transmission occasions.

Some aspects described herein relate to a non-transitory computer-readable medium that stores a set of instructions for wireless communication. The set of instructions may include one or more instructions that, when executed by an initiating UE, cause the initiating UE to obtain PSFCH information that indicates a plurality of PSFCH transmission occasions. The set of instructions may include one or more instructions that, when executed by an initiating UE, cause the initiating UE to transmit, to a responding UE, a sidelink communication. The set of instructions may include one or more instructions that, when executed by an initiating UE, cause the initiating UE to receive, in accordance with the PSFCH information indicating that the responding UE is to transmit HARQ feedback associated with the sidelink communication in at least a first PSFCH transmission occasion of the plurality of PSFCH transmission occasions, the HARQ feedback associated with the sidelink communication in at least the first PSFCH transmission occasion of the plurality of PSFCH transmission occasions.

Some aspects described herein relate to a non-transitory computer-readable medium that stores a set of instructions for wireless communication. The set of instructions may include one or more instructions that, when executed by a responding UE, cause the responding UE to obtain PSFCH information that indicates for transmission of HARQ feedback in each PSFCH transmission occasion of a plurality of PSFCH transmission occasions. The set of instructions may include one or more instructions that, when executed by a responding UE, cause the responding UE to receive, from an initiating UE, a sidelink communication. The set of instructions may include one or more instructions that, when executed by a responding UE, cause the responding UE to transmit, to the initiating UE in accordance with the PSFCH information, HARQ feedback associated with the sidelink communication in each PSFCH transmission occasion of the plurality of PSFCH transmission occasions.

Some aspects described herein relate to a non-transitory computer-readable medium that stores a set of instructions for wireless communication. The set of instructions may include one or more instructions that, when executed by a responding UE, cause the responding UE to obtain PSFCH information that indicates for transmission of HARQ feedback in at least a first PSFCH transmission occasion of a plurality of PSFCH transmission occasions. The set of instructions may include one or more instructions that, when executed by a responding UE, cause the responding UE to receive, from an initiating UE, a sidelink communication. The set of instructions may include one or more instructions that, when executed by a responding UE, cause the responding UE to transmit, to the initiating UE in accordance with the PSFCH information, HARQ feedback associated with the sidelink communication in at least the first PSFCH transmission occasion of the plurality of PSFCH transmission occasions.

Some aspects described herein relate to an apparatus for wireless communication. The apparatus may include means for obtaining PSFCH information that indicates a plurality of PSFCH transmission occasions. The apparatus may include means for transmitting, to a responding UE, a sidelink communication. The apparatus may include means for receiving, in accordance with the PSFCH information indicating that the responding UE is to transmit HARQ feedback associated with the sidelink communication in each PSFCH transmission occasion of the plurality of PSFCH transmission occasions, the HARQ feedback associated with the sidelink communication in each PSFCH transmission occasion of the plurality of PSFCH transmission occasions.

Some aspects described herein relate to an apparatus for wireless communication. The apparatus may include means for obtaining PSFCH information that indicates a plurality of PSFCH transmission occasions. The apparatus may include means for transmitting, to a responding UE, a sidelink communication. The apparatus may include means for receiving, in accordance with the PSFCH information indicating that the responding UE is to transmit HARQ feedback associated with the sidelink communication in at least a first PSFCH transmission occasion of the plurality of PSFCH transmission occasions, the HARQ feedback associated with the sidelink communication in at least the first PSFCH transmission occasion of the plurality of PSFCH transmission occasions.

Some aspects described herein relate to an apparatus for wireless communication. The apparatus may include means for obtaining PSFCH information that indicates for transmission of HARQ feedback in each PSFCH transmission occasion of a plurality of PSFCH transmission occasions. The apparatus may include means for receiving, from an initiating UE, a sidelink communication. The apparatus may include means for transmitting, to the initiating UE in accordance with the PSFCH information, HARQ feedback associated with the sidelink communication in each PSFCH transmission occasion of the plurality of PSFCH transmission occasions.

Some aspects described herein relate to an apparatus for wireless communication. The apparatus may include means for obtaining PSFCH information that indicates for transmission of HARQ feedback in at least a first PSFCH transmission occasion of a plurality of PSFCH transmission occasions. The apparatus may include means for receiving, from an initiating UE, a sidelink communication. The apparatus may include means for transmitting, to the initiating UE in accordance with the PSFCH information, HARQ feedback associated with the sidelink communication in at least the first PSFCH transmission occasion of the plurality of PSFCH transmission occasions.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 3 is a diagram illustrating an example of sidelink communications in accordance with the present disclosure in accordance with the present disclosure.

FIG. 8 is a flowchart illustrating an example process for PSFCH transmission in each PSFCH transmission occasion of a plurality of PSFCH transmission occasions performed, for example, by an initiating UE in accordance with the present disclosure.

FIG. 9 is a flowchart illustrating an example process for PSFCH transmission in at least a first PSFCH transmission occasion of a plurality of PSFCH transmission occasions performed, for example, by an initiating UE in accordance with the present disclosure.

FIG. 11 is a flowchart illustrating an example process for PSFCH transmission in at least a first PSFCH transmission occasion of a plurality of PSFCH transmission occasions performed, for example, by a responding UE in accordance with the present disclosure.

DETAILED DESCRIPTION

Figure 1:
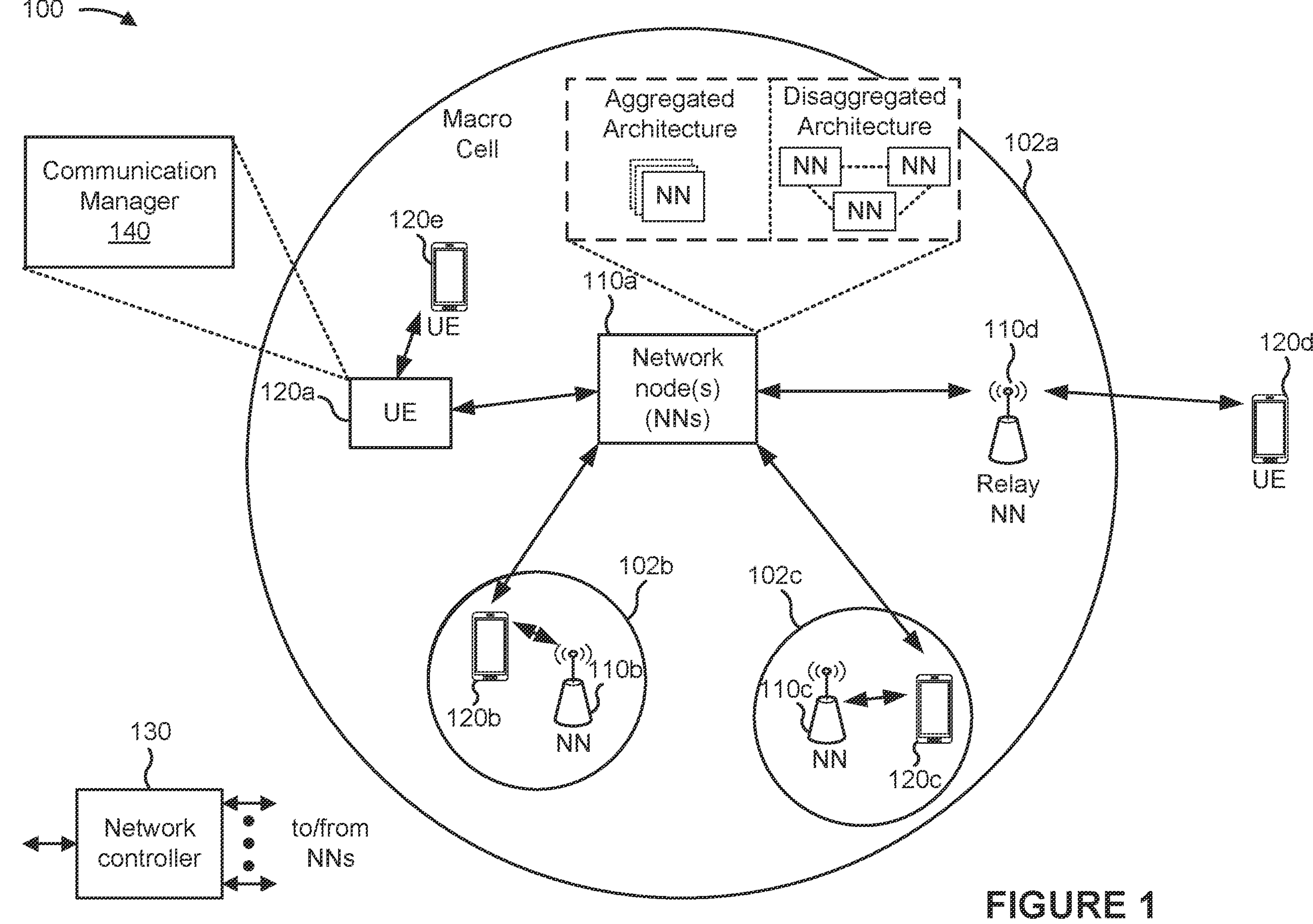
FIG. 1 is a diagram illustrating an example of a wireless network in accordance with the present disclosure.

Various aspects of the disclosure are described more fully hereinafter with reference to the accompanying drawings.

This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Hybrid automatic repeat request (HARQ) feedback may be transmitted by a user equipment (UE) to indicate whether the UE has received a communication from another device. The HARQ feedback may include an acknowledgement (ACK) to indicate that the UE successfully received the communication from the other device, or may include a negative acknowledgement (NACK) to indicate that the UE did not successfully receive the communication from the other device. In sidelink communications, the other device may be another UE, and the HARQ feedback may be transmitted by the UE to the other UE via a physical sidelink feedback channel (PSFCH).

An interlace is a basic unit of resource allocation, such as an air interface resource allocation, that is characterized in accordance with any combination of a frequency span (e.g., that may be partitioned into sub-bands and/or sub-carriers), a time span (e.g., that may be partitioned into sub-time spans, such as time slots and/or symbols), and/or one or more physical resource blocks (PRBs). An interlace may be, for example, a common interlace or a dedicated interlace. In some examples, resources of the common interlace may be accessible to any UE and/or may be shared by a plurality of UEs, while resources of the dedicated interlace may be accessible only to a single UE at a given time. In some examples, each PSFCH transmission may occupy a single common interlace and a quantity (for example, K3) of dedicated physical resource blocks (PRBs). The quantity of dedicated PRBs may be, for example, one PRB, two PRBs, or five PRBs. In some other examples, each PSFCH transmission may occupy a single dedicated interlace.

A listen-before-talk (LBT) process may be used to regulate access to a channel. For example, a UE may use the LBT process to minimize collisions and interference between the UE and one or more other UEs communicating on a sidelink channel. In one example, the UE may listen to the sidelink channel to identify whether the sidelink channel is being used for transmissions by one or more other UEs. If the UE identifies that the channel is clear (for example, is not being used for transmissions by another UE), the UE may perform a transmission on the channel. Alternatively, if the UE identifies that the channel is busy (for example, is being used for a transmission by another UE), the UE may wait a time period and may perform another LBT process to identify whether the channel is clear or busy.

In a first example, a UE that receives a physical sidelink control channel (PSCCH) communication or physical sidelink shared channel (PSSCH) communication may perform a PSFCH transmission on a candidate PSFCH transmission occasion in accordance with the UE failing to transmit on a previous PSFCH transmission occasion due to LBT failure. For example, the UE that receives the PSCCH/PSSCH communication may only perform the PSFCH transmission on the candidate PSFCH transmission occasion if the UE fails to transmit on the previous PSFCH transmission occasion due to LBT failure. In a second example, the UE that receives the PSCCH/PSSCH communication may perform PSFCH transmissions on all PSFCH transmission occasions within a channel occupancy time (COT). A COT may indicate a time period during which communications between a first UE and a second UE are to occur. The first UE, which may be referred to as a COT initiating UE, may establish the COT in accordance with a time period to be used for communicating with the second UE, which may be referred to as a responding UE. In one example, the first UE may identify the time period in accordance with a quantity of data that is to be transmitted to the second UE, and may establish the COT in accordance with the identified time period. The COT may be used, for example, to reserve one or more resources to be used for the communications between the first UE and the second UE during the time period, and/or may be used to measure one or more characteristics of the channel associated with the COT, such as a channel throughput or a channel performance, among other examples. In some examples, one or more PSFCH gaps may occur within the COT. A PSFCH gap is a PSFCH transmission occasion during which an ACK or NACK is not transmitted by the COT initiating UE or the responding UE. In some cases, the COT initiating UE may determine to perform one or more transmissions on a PSFCH transmission occasion that occurs after the PSFCH gap. However, the PSFCH gap may result in a termination of the COT. Therefore, the COT initiating UE may not be able to schedule the transmissions on the PSFCH transmission occasions that occur after the PSFCH gap. This may result in missed transmission opportunities between the COT initiating UE and the responding UE. Additionally or alternatively, this may require the COT initiating UE to re-initiate the COT in order for communications between the COT initiating UE and the responding UE to resume. In some cases, the COT initiating UE may identify that the responding UE is to fill a PSFCH gap with a padding signal in order to prevent COT termination. The COT initiating UE may perform a single PSFCH transmission at the earliest PSFCH transmission occasion that clears the LBT. However, the COT initiating UE may not be able to identify which PSFCH transmission occasions are available and which PSFCH transmission occasions are being used for padding signal transmissions.

Various aspects generally relate to sidelink communications and PSFCH transmissions. A COT initiating UE may obtain PSFCH information that indicates a plurality of PSFCH transmission occasions. The COT initiating UE may transmit a sidelink communication to a responding UE. In some aspects, the COT initiating UE may identify that the responding UE is to transmit HARQ feedback in each PSFCH transmission occasion of the plurality of PSFCH transmission occasions. For example, the COT initiating UE may assume that the responding UE will transmit HARQ feedback in all PSFCH transmission occasions within the COT. In some other aspects, the COT initiating UE may identify that the responding UE is to transmit HARQ feedback in at least the first PSFCH transmission occasion of the plurality of PSFCH transmission occasions. For example, the COT initiating UE may assume that the responding UE will transmit HARQ feedback in at least the first PSFCH transmission occasion of the plurality of PSFCH transmission occasions within the COT. In one example, the COT initiating UE may identify that the responding UE is to transmit HARQ feedback only in the first PSFCH transmission occasion of the plurality of PSFCH transmission occasions. In another example, the COT initiating UE may identify that the responding UE is to transmit HARQ feedback in one or more PSFCH transmission occasions (that include the first PSFCH transmission occasion) until a target HARQ feedback is received from the responding UE. After the target HARQ feedback is received from the responding UE, the COT initiating UE may identify that the responding UE is not to transmit HARQ feedback in any remaining PSFCH transmission occasions of the plurality of PSFCH transmission occasions. In some aspects, the COT initiating UE may transmit a PSFCH padding signal in order to fill a PSFCH gap that occurs in a PSFCH transmission occasion of the plurality of PSFCH transmission occasions. Additionally or alternatively, the COT initiating UE may trigger the responding UE (for example, using sidelink control information) to transmit a PSFCH padding signal to fill the PSFCH gap that occurs in the PSFCH transmission occasion of the plurality of PSFCH transmission occasions.

Particular aspects of the subject matter described in this disclosure can be implemented to realize one or more of the following potential advantages. In some examples, by identifying that the responding UE is to transmit HARQ feedback in one or more PSFCH transmission occasions, the described techniques can be used to reduce a likelihood of COT discontinuation. For example, by assuming that the responding UE will transmit HARQ feedback in each PSFCH transmission occasion of the plurality of PSFCH transmission occasions, the likelihood of COT discontinuation may be reduced as a result of each PSFCH transmission occasion within the COT being occupied by HARQ feedback. Alternatively, by assuming that the responding UE will transmit HARQ feedback in at least the first PSFCH transmission occasion of the plurality of PSFCH transmission occasions, the likelihood of COT discontinuation may be reduced as a result of at least the first PSFCH transmission occasion being occupied by HARQ feedback. In some aspects, by transmitting a padding signal in a PSFCH gap that occurs within the plurality of PSFCH transmission occasions, or by triggering the responding UE to transmit a padding signal in the PSFCH gap that occurs within the plurality of PSFCH transmission occasions, the COT may be maintained (for example, continued) for each PSFCH transmission occasion of the plurality of PSFCH transmission occasions even when HARQ feedback is not actually transmitted at each PSFCH transmission occasion of the plurality of PSFCH transmission occasions. Additionally, by communicating padding signal information, for example, using sidelink control information, the COT initiating UE and the responding UE may synchronize PSFCH and padding signal transmissions to prevent overlapping transmissions and to reduce a likelihood of the COT being discontinued. These example advantages, among others, are described in more detail below.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*c*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHZ-7.125 GHZ) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, the term "sub-6 GHZ," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. In some aspects, as described in more detail elsewhere herein, the communication manager 140 may obtain PSFCH information that indicates a plurality of PSFCH transmission occasions; transmit, to a responding UE, a sidelink communication; and receive, in accordance with the PSFCH information indicating that the responding UE is to transmit HARQ feedback associated with the sidelink communication in each PSFCH transmission occasion of the plurality of PSFCH transmission occasions, the HARQ feedback associated with the sidelink communication in each PSFCH transmission occasion of the plurality of PSFCH transmission occasions. Additionally or alternatively, the communication manager 140 may perform one or more other operations described herein. In some aspects, the UE 120 may include a communication manager 140. In other some aspects, as described in more detail elsewhere herein, the communication manager 140 may obtain PSFCH information that indicates a plurality of PSFCH transmission occasions; transmit, to a responding UE, a sidelink communication; and receive, in accordance with the PSFCH information identifying that the responding UE is to transmit HARQ feedback associated with the sidelink communication in at least a first PSFCH transmission occasion of the plurality of PSFCH transmission occasions, the HARQ feedback associated with the sidelink communication in at least the first PSFCH transmission occasion of the plurality of PSFCH transmission occasions. In some other aspects, as described in more detail elsewhere herein, the communication manager 140 may obtain PSFCH information that indicates for transmission of HARQ feedback in each PSFCH transmission occasion of a plurality of PSFCH transmission occasions; receive, from an initiating UE, a sidelink communication; and transmit, to the initiating UE in accordance with the PSFCH information, HARQ feedback associated with the sidelink communication in each PSFCH transmission occasion of the plurality of PSFCH transmission occasions. In some aspects, as described in more detail elsewhere herein, the communication manager 140 may obtain PSFCH information that indicates for transmission of HARQ feedback in at least a first PSFCH transmission occasion of a plurality of PSFCH transmission occasions; receive, from an initiating UE, a sidelink communication; and transmit, to the initiating UE in accordance with the PSFCH information, HARQ feedback associated with the sidelink communication in at least the first PSFCH transmission occasion of the plurality of PSFCH transmission occasions. Additionally or alternatively, the communication manager 140 may perform one or more other operations described herein.

Figure 2:
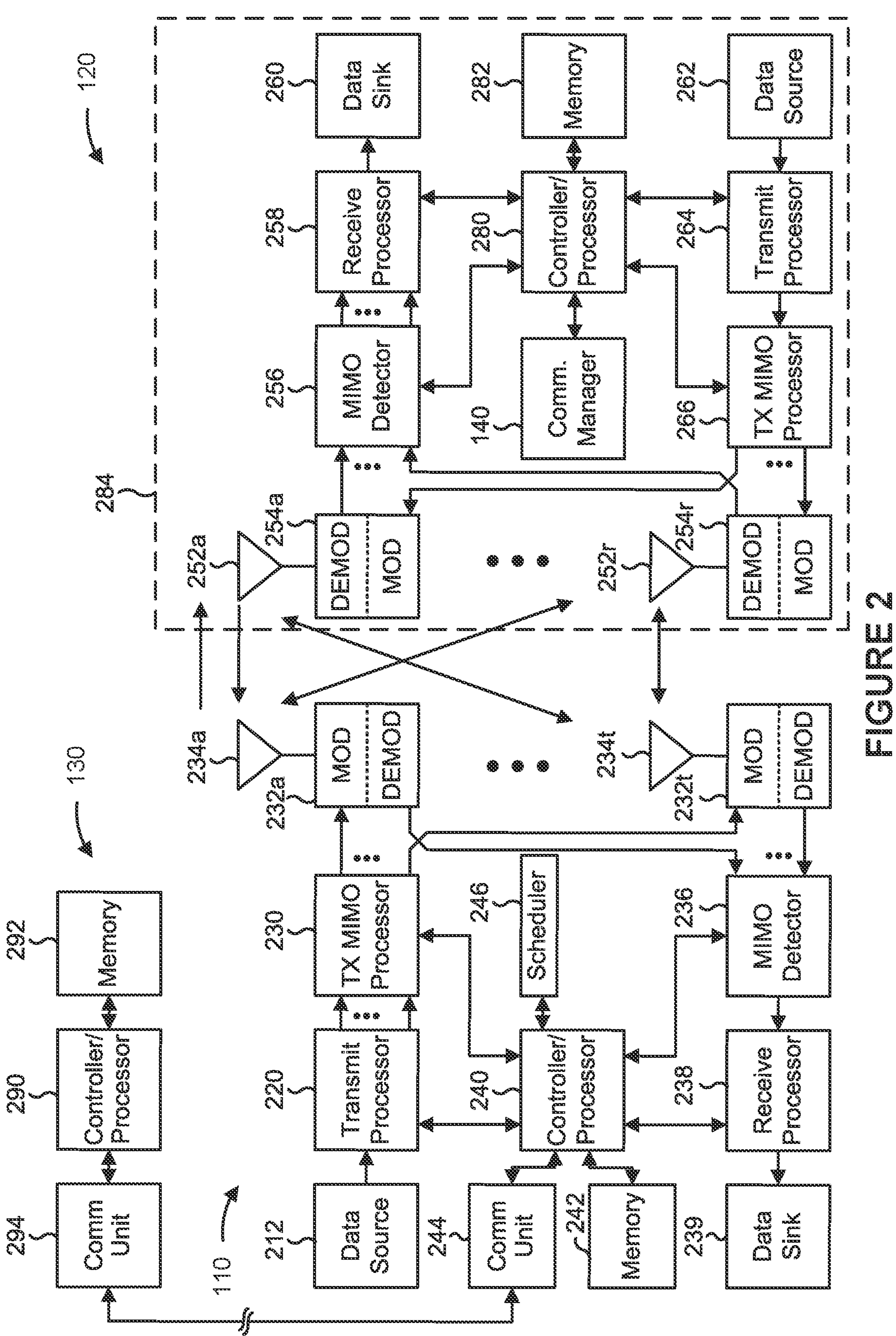
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of depicted in FIG. 2 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs)

for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the network node 110 or other network nodes 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers and/or one or more processors. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with PSFCH transmissions, as described in more detail elsewhere herein. For example, the controller/processor 240 of the network node 110, the controller/processor 280 of the UE 120, or any other component(s) of FIG. 2 may perform or direct operations of, for example, process 800 of FIG. 8, process 900 of FIG. 9, process 1000 of FIG. 10, process 1100 of FIG. 11, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 800 of FIG. 8, process 900 of FIG. 9, process 1000 of FIG. 10, process 1100 of FIG. 11, or other processes as described herein. In some examples, executing instructions may include running the instructions, converting the instructions, compiling the instructions, or interpreting the instructions, among other examples.

In some aspects, an initiating UE (for example, the UE 120) includes means for obtaining PSFCH information that indicates a plurality of PSFCH transmission occasions; means for transmitting, to a responding UE, a sidelink communication; and/or means for identifying, in accordance with the PSFCH information, that the responding UE is to transmit HARQ feedback associated with the sidelink communication in each PSFCH transmission occasion of the plurality of PSFCH transmission occasions. The means for the initiating UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an initiating user equipment (for example, the UE 120) includes means for obtaining PSFCH information that indicates a plurality of PSFCH transmission occasions; means for transmitting, to a responding UE, a sidelink communication; and/or means for identifying, in accordance with the PSFCH information, that the responding UE is to transmit HARQ feedback associated with the sidelink communication in at least a first PSFCH transmission occasion of the plurality of PSFCH transmission occasions. The means for the initiating UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a responding user equipment (for example, the UE 120) includes means for obtaining PSFCH information that indicates for transmission of HARQ feedback in each PSFCH transmission occasion of a plurality of PSFCH transmission occasions; means for receiving, from an initiating UE, a sidelink communication; and/or means for transmitting, to the initiating UE in accordance with the PSFCH information, HARQ feedback associated with the sidelink communication in each PSFCH transmission occasion of the plurality of PSFCH transmission occasions. The means for the responding UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a responding UE (for example, the UE 120) includes means for obtaining PSFCH information that indicates for transmission of HARQ feedback in at least a first PSFCH transmission occasion of a plurality of PSFCH transmission occasions; means for receiving, from an initiating UE, a sidelink communication; and/or means for transmitting, to the initiating UE in accordance with the PSFCH information, HARQ feedback associated with the sidelink communication in at least the first PSFCH transmission occasion of the plurality of PSFCH transmission occasions. The means for the responding UE to perform operations described herein may include, for example, one or more of communication manager 140, antenna 252, modem 254, MIMO detector 256, receive processor 258, transmit processor 264, TX MIMO processor 266, controller/processor 280, or memory 282.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, and/or one or more RUs).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

FIG. 3 is a diagram illustrating an example 300 of sidelink communications in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (for example, which may include V2V communications, V2I communications, and/or V2P communications) and/or mesh networking. In some examples, the UEs 305 (for example, UE 305-1 and/or UE 305-2) may correspond to one or more other UEs described elsewhere herein, such as UE 120. In some examples, the one or more sidelink channels 310 may use a PC5 interface and/or may operate in a high frequency band (for example, the 5.9 GHz band). Additionally or alternatively, the UEs 305 may synchronize timing of transmission time intervals (TTIs) (for example, frames, subframes, slots, or symbols) using global navigation satellite system (GNSS) timing.

As further shown in FIG. 3, the one or more sidelink channels 310 may include a PSCCH 315, a PSSCH 320, and/or a PSFCH 325. The PSCCH 315 may be used to communicate control information, similar to a physical downlink control channel (PDCCH) and/or a physical uplink control channel (PUCCH) used for cellular communications with a network node 110 via an access link or an access channel. The PSSCH 320 may be used to communicate data, similar to a physical downlink shared channel (PDSCH) and/or a physical uplink shared channel (PUSCH) used for cellular communications with a network node 110 via an access link or an access channel. For example, the PSCCH 315 may carry sidelink control information (SCI) 330, which may indicate various control information used for sidelink communications, such as one or more resources (for example, time resources, frequency resources, and/or spatial resources) where a transport block (TB) 335 may be carried on the PSSCH 320. The TB 335 may include data. The PSFCH 325 may be used to communicate sidelink feedback 340, such as HARQ feedback (for example, acknowledgement or negative acknowledgement (ACK/NACK) information), transmit power control (TPC), and/or a scheduling request (SR). For example, the UE 305-1, which may be a responding UE, may receive HARQ feedback (such as an ACK or a NACK) from the UE 305-1, which may be a COT initiating UE. The HARQ feedback may be received via one or more PSFCH transmission occasions associated with the PSFCH 325.

Although shown on the PSCCH 315, in some examples, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (for example, time resources, frequency resources, and/or spatial resources) on the PSSCH 320, information for decoding sidelink communications on the PSSCH, a quality of service (QOS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some examples, the one or more sidelink channels 310 may use resource pools. For example, a scheduling assignment (for example, included in SCI 330) may be transmitted in sub-channels using specific resource blocks (RBs) across time. In some examples, data transmissions (for example, on the PSSCH 320) associated with a scheduling assignment may occupy adjacent RBs in the same subframe as the scheduling assignment (for example, using frequency division multiplexing). In some examples, a scheduling assignment and associated data transmissions are not transmitted on adjacent RBs.

In some examples, a UE 305 may operate using a sidelink transmission mode (for example, Mode 1) where resource selection and/or scheduling is performed by a network node 110 (for example, a base station, a CU, or a DU). For example, the UE 305 may receive a grant (for example, in downlink control information (DCI) or in a radio resource control (RRC) message, such as for configured grants) from the network node 110 (for example, directly or via one or more network nodes) for sidelink channel access and/or scheduling. In some examples, a UE 305 may operate using a transmission mode (for example, Mode 2) where resource selection and/or scheduling is performed by the UE 305 (for example, rather than a network node 110). In some examples, the UE 305 may perform resource selection and/or scheduling by sensing channel availability for transmissions. For example, the UE 305 may measure an RSSI parameter (for example, a sidelink-RSSI (S-RSSI) parameter) associated with various sidelink channels, may measure an RSRP parameter (for example, a PSSCH-RSRP parameter) associated with various sidelink channels, and/or may measure an RSRQ parameter (for example, a PSSCH-RSRQ parameter) associated with various sidelink channels, and may select a channel for transmission of a sidelink communication based at least in part on the measurement(s).

Additionally or alternatively, the UE 305 may perform resource selection and/or scheduling using SCI 330 received in the PSCCH 315, which may indicate occupied resources and/or channel parameters. Additionally or alternatively, the UE 305 may perform resource selection and/or scheduling by determining a channel busy ratio (CBR) associated with various sidelink channels, which may be used for rate control (for example, by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (for example, transmission parameters) to be used for an upcoming sidelink transmission, such as one or more resource blocks to be used for the upcoming sidelink transmission on the PSSCH 320 (for example, for TBs 335), one or more subframes to be used for the upcoming sidelink transmission, and/or an MCS to be used for the upcoming sidelink transmission. In some examples, a UE 305 may generate a sidelink grant that indicates one or more parameters for semi-persistent scheduling (SPS), such as a periodicity of a sidelink transmission. Additionally or alternatively, the UE 305 may generate a sidelink grant for event-driven scheduling, such as for an on-demand sidelink message.

Figure 4:
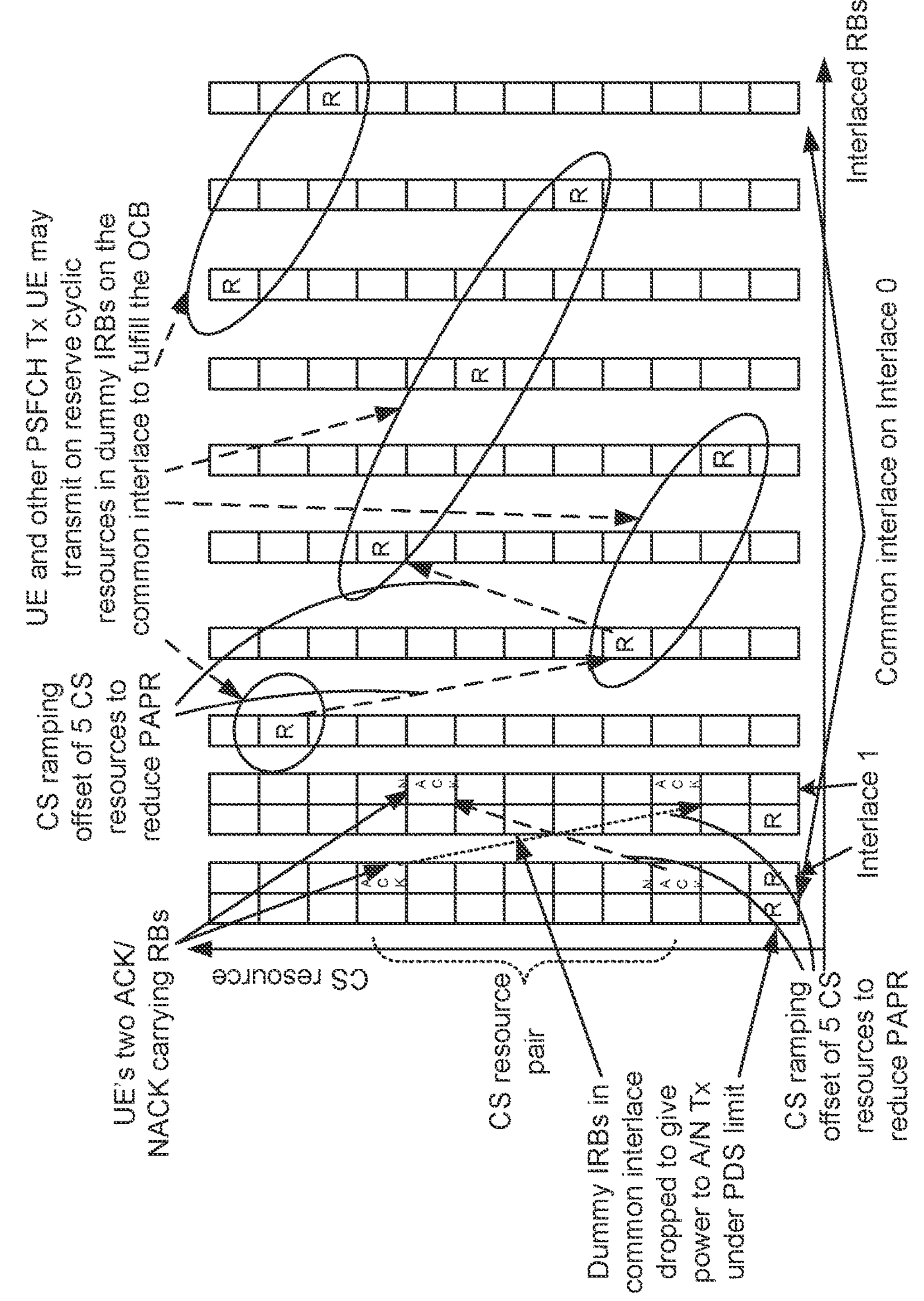
FIG. 4 is a diagram illustrating an example of a physical sidelink feedback channel (PSFCH) waveform in accordance with the present disclosure.

FIG. 4 is a diagram illustrating an example 400 of a PSFCH waveform. The PSFCH waveform may be associated with a PSFCH transmission with 15 kilohertz (kHz) sub-carrier spacing (SCS) or 30 kHz SCS. In a first example, each PSFCH transmission may occupy a single common interlace and K3 dedicated PRBs. A value of K3 may be configured (for example, pre-configured) at the UE. For example, K3 may be equal to 1, 2, or 5, among other examples. The K3 dedicated PRBs may be located on the same interlace. In some examples, there may be one or more guard band PRBs between a common PRB and a dedicated PRB. On the K3 dedicated PRBs, multiple cyclic shift (CS) pairs may be used (for example, as in legacy NR sidelink (SL) PSFCH transmission). When a PRB of the common interlace and a dedicated PRB are located within a same 1 megahertz (MHz) bandwidth, the UE may only transmit on the dedicated PRB (subject to meeting occupied channel bandwidth (OCB) requirements). In a second example, each PSFCH transmission may occupy a single dedicated interlace. PSSCH transmissions on non-overlapped resources may be mapped to orthogonal dedicated PRBs for PSFCH transmission.

Example 400 is an example of a unified framework between the first example (where a PSFCH transmission occupies a common interlace and K3 dedicated PRBs) and the second example (where a PSFCH transmission occupies a single dedicated interlace). A configurable number (for example, K3) of contiguous ACK/NACK carrying PRBs may be transmitted on a non-common interlace and N K3 dummy PSFCH interlace resource blocks (IRBs) may be transmitted on the common interlace. N may be equal to the number of IRBs in one interlace. The PSFCH waveform may become a full interlaced PSFCH waveform in accordance with K3 being equal to N (K3=N). In some examples, configuring more than one ACK/NACK carrying IRB may resolve a low transmit power issue that occurs due to a power spectral density (PSD) limit and a near-far problem. As shown in FIG. 4, a UE may have two ACK/NACK carrying RBs. A CS ramping offset of five CS resources may be used to reduce a peak-to-average power ratio (PAPR). Dummy IRBs that are within X RBs of the ACK/NACK carrying IRBs may be dropped in order to maintain the ACK/NACK transmit power under the PSD limit. The UE and another PSFCH transmitting UE may transmit on reserved (R) cyclic resources in the dummy IRBs on the common interlace, for example, to fulfill the OCB.

Figure 5:
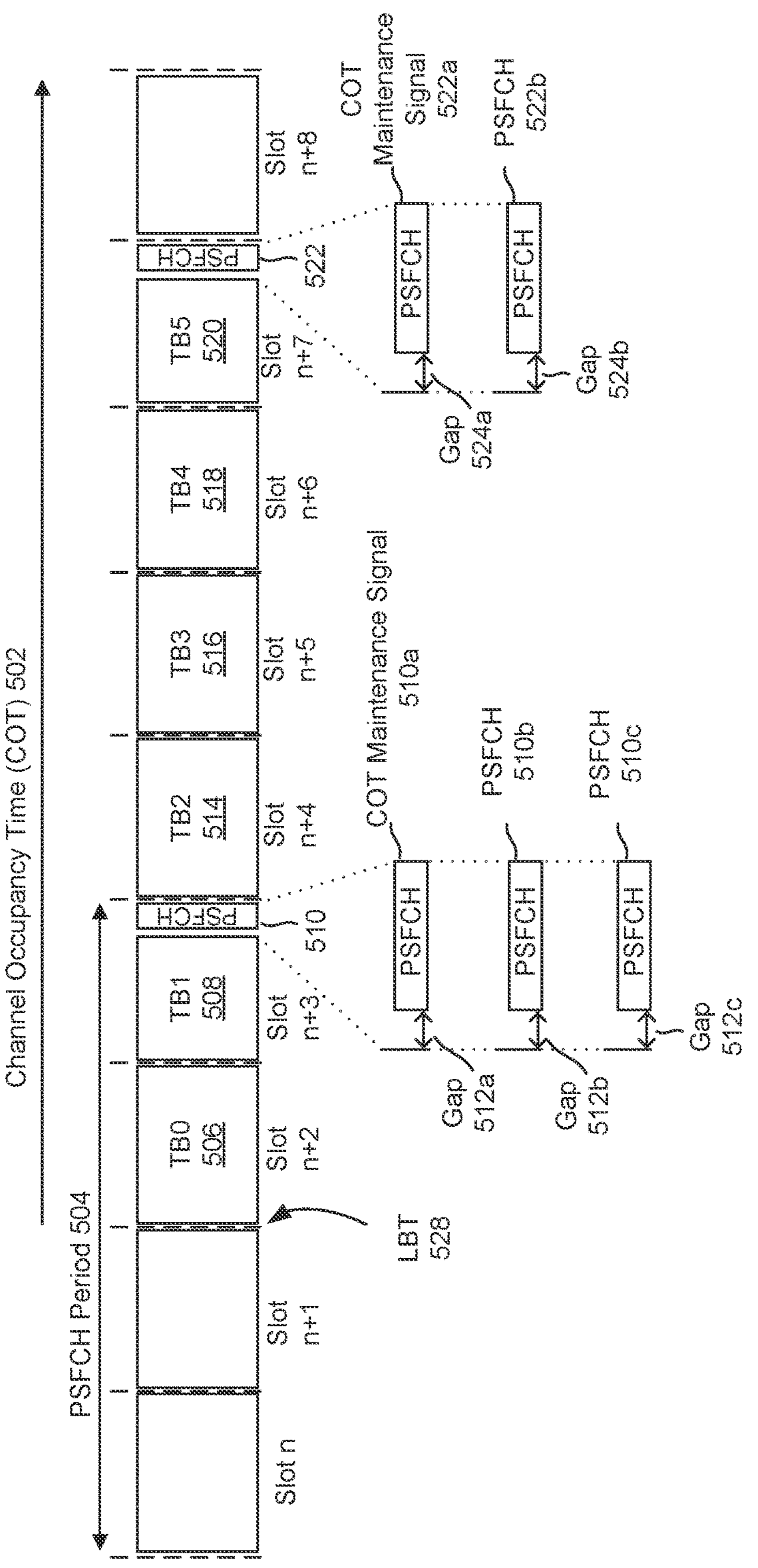
FIG. 5 is a diagram illustrating an example of channel occupancy time maintenance for sidelink communications in accordance with the present disclosure.

FIG. 5 is a diagram illustrating an example 500 of COT maintenance for sidelink communications. In some examples, a COT initiating UE may perform LBT 528 to clear a channel and initiate COT 502 for transmitting a sidelink communication to a receiving UE. For example, the COT initiating UE may determine that the channel is available for initiating COT 502 because no other UEs are transmitting during slot n and/or slot n+1. In some examples, COT 502 may begin at slot n+2, and COT 502 may end at slot n+8 (for example, COT 502 may include 7 slots). In some examples, the COT initiating UE may transmit multiple TBs during COT 502 (for example, the COT initiating UE may transmit TB0 506, TB1 508, TB2 514, TB3 516, TB4 518, and TB5 520).

In some examples, sidelink communication 500 may include one or more PSFCH instances (for example, PSFCH instance 510 and PSFCH instance 522) that may be scheduled based on PSFCH period 504 (for example, every 1 slot, every 2 slots, every 4 slots, etc.). For instance, PSFCH period 504 may be set to a value of 4 such that a PSFCH instance is scheduled every 4 slots. In some examples, a PSFCH instance may be referred to as a PSFCH transmission occasion. For example, PSFCH instance 510 may correspond to a first PSFCH transmission occasion and PSFCH instance 522 may correspond to a second PSFCH transmission occasion. In some examples, PSFCH instance 510 may be scheduled within slot n+3 (for example, within a same slot as transmission of TB1 508) and a subsequent PSFCH instance 522 may be scheduled within slot n+7 (for example, within a same slot as transmission of TB5 520).

In some examples, COT 502 may be interrupted if the COT initiating UE does not transmit during PSFCH instance 510 and/or PSFCH instance 522. In some examples, a transmission gap that exceeds a threshold value (for example, 25 μs) may cause the COT initiating UE to repeat LBT to initiate a new COT. In some examples, initiating a new COT may result in degraded performance due to the delay in performing LBT.

In some examples, the COT initiating UE may maintain COT 502 by transmitting COT maintenance signal **510*a* during PSFCH instance 510 and/or by transmitting COT maintenance signal 522*a* during PSFCH instance 522. In some examples, COT maintenance signal 510*a* and/or COT maintenance signal 522*a* may include HARQ feedback (for example, ACK/NACK) that is transmitted to the receiving UE (for example, the COT initiating UE may transmit HARQ feedback to the receiving UE corresponding to a prior transmission received from the receiving UE). In some examples, COT maintenance signal 510*a* and/or COT maintenance signal 522*a* may be implemented using a cyclic prefix extension (CPE). For example, COT maintenance signal 510*a* may be implemented using a CPE that is configured to fill all or a portion of gap 512*a* with an extended PSFCH symbol (for example, CPE may be used to reduce gap 512*a*** to less than 16 us or to less than 25 μs).

In some examples, the COT initiating UE may not have any HARQ feedback to transmit to the receiving UE. In some examples, COT maintenance signal **510*a* and/or COT maintenance signal 522*a* may include padding data or filler data that may be transmitted using PSFCH resources that do not interfere with resources used by other UEs. For example, the PSFCH resources used by the COT initiating UE to transmit COT maintenance signal 510*a* and/or COT maintenance signal 522*a*** may be orthogonal to PSFCH resources used by the receiving UE.

In some examples, the COT initiating UE may select PSFCH resources for COT maintenance signal **510*a* and/or COT maintenance signal 522*a*** based on a transmitter identifier (for example, an L1 ID) that is associated with the COT initiating UE. In one example, PSFCH resources for the COT maintenance signal may be determined based on equation (1) below, in which Pip is the transmitter ID, MID is the groupcast ID (for example, may be set to 0 in some examples), and $$R_{PRB,CS}^{PSFCH}$$

is the PSFCH resource pool size, as follows:

$$(P_{ID}+M_{ID})\mathrm{mod}R_{PRB,CS}^{PSFCH} \tag{1}$$

In some examples, COT maintenance signal **510*a* and/or COT maintenance signal 522*a* may use all or a portion of the PSFCH resources that are based on the transmitter ID. In some examples, the COT initiating UE may select (for example, randomly) a PSFCH RB group or a PSFCH interlace. In some examples, the COT initiating UE may select a fixed RB group or PSFCH interlace. In some examples, the COT maintenance signal (for example, COT maintenance signal 510*a*** and/or COT maintenance signal 522*a*) may use an interlaced PSFCH format (for example, PF0, PF2, and/or any other suitable format).

In some examples, the COT initiating UE may select PSFCH resources for COT maintenance signal 510*a* and/or COT maintenance signal 522*a* from a reserved set of PSFCH resources (for example, a reserved set of PSFCH resources may be excluded from PSFCH resource pool). In some examples, the reserved set of PSFCH resources may include a reserved cyclic shift and a reserved PSFCH RB or PSFCH interlace from a PSFCH group. In some examples, the COT initiating UE may select (for example, randomly) the PSFCH RB group or PSFCH interlace from the reserved set of PSFCH resources. In some examples, the COT initiating UE may select a fixed or predetermined PSFCH RB or PSFCH interlace (for example, based on UE parameters or settings).

In some examples, a first PSFCH transmission occasion (corresponding to PSFCH instance 510) and/or a second PSFCH transmission occasion (e.g., corresponding to PSFCH instance 522) may include one or more PSFCH transmissions from other UEs. For example, a PSFCH instance may be shared among the COT initiating UE (for example, the COT initiating UE) and one or more receiving UEs that are transmitting HARQ feedback (for example, the receiving UE). In some examples, PSFCH instance 510 may include a PSFCH transmission 510*b* (for example, HARQ feedback from the receiving UE to the COT initiating UE).

In some examples, COT maintenance signal 510*a*, PSFCH 510*b*, and PSFCH 510*c* may be aligned in the time domain (for example, have a same starting time/position). In some examples, aligning transmission of signals within PSFCH instance 510 may avoid LBT blocking among the UEs (for example, COT maintenance signal 510*a* may block PSFCH 510*b* and/or PSFCH 510*c* based on LBT protocol if the signals are not transmitted at or near the same time).

In some examples, the COT initiating UE may transmit one or more parameters associated with COT maintenance signal 510*a* to the receiving UE. For example, the COT initiating UE may transmit an LBT type, one or more CPE parameters, a priority class, a COT duration, a COT start time, an RB set bitmap, any combination thereof, and/or any other parameter associated with COT maintenance signal 510*a*. In some examples, the one or more parameters may be included in first stage sidelink control information (SCI-1) included in a PSCCH and/or in second stage SCI (SCI-2) included in a PSSCH. For example, the PSSCH scheduling SCI-2 may include the LBT type, the CPE parameters, and the priority class of CAT-1 LBT for PSFCH 510*b*. In one example, the COT initiating UE may instruct the receiving UE to use CAT-2 LBT (for example, type A/B/C) with CPE to close gap 512*b* to 16 us or 25 us when PSFCH instance 510 is within COT 502. In another example, the COT initiating UE may instruct the receiving UE to use CAT-1 LBT with a lowest priority value and a full symbol gap (for example, gap 512*b*) when the PSFCH is outside of COT 502 (not illustrated).

In some examples, the one or more parameters may be included in COT system information (COT-SI). In some examples, COT-SI may be included in SCI-1 and/or SCI-2 for COT sharing. In some examples, parameters for COT sharing may be updated based on the COT-SI. In some examples, the COT initiating UE may broadcast COT-SI to all sidelink nodes (for example, all UEs) including targeted receiving UEs and non-target receivers.

In some examples, the COT initiating UE may use the same or different parameters for one or more PSFCH instances. For example, PSFCH instance 510 and PSFCH instance 522 may use the same parameters (for example, LBT type, CPE parameters, etc.). In some examples, the COT initiating UE may configure in-COT PSFCH instances with different parameters. In some examples, PSFCH instances that occur in a COT region corresponding to a data burst may be configured with different parameters than PSFCH instances that occur in a remaining time-division multiplexing (TDM) COT region (for example, after a long data burst). For example, the COT initiating UE may configure signal parameters corresponding to PSFCH instance 510 (for example, within a data burst) to use type 1C-LBT with a 16 us gap (for example, gap 512*a*, gap 512*b*, and gap 512*c*) to avoid additional LBT during the long data burst. In another example, the COT initiating UE may configure signal parameters corresponding to PSFCH instance 522 (for example, after a long data burst) to use type 2A-LBT with a 25 μs gap (for example, gap 524*a* associated with COT maintenance signal 522*a* and gap 524*b* associated with PSFCH 522*b*) so that one or more receiving UEs may share COT 502 for PSFCH transmission. In some examples, SCI may be used to identify or indicate different COT regions (for example, start/end of COT regions corresponding to a data burst and/or start/end of a remaining COT region).

In some examples, the one or more parameters corresponding to PSFCH instances (for example, PSFCH instance 510 and/or PSFCH instance 522) may be configured using RRC. In some examples, the COT-SI may be used to indicate the start of the remaining COT (for example, start of slot n+8). In some examples, the COT-SI may include CPE parameters that may be used to align the PSFCH transmission starting times among non-target receivers, target receivers (for example, the receiving UE), and a COT initiator (for example, the COT initiating UE).

In some examples, a non-target receiver may monitor the sidelink transmissions from the COT initiating UE to the receiving UE. In some examples, the non-target receiver may use the SCI (for example, SCI-1 and/or SCI-2) from the COT initiating UE to determine one or more parameters (for example, the PSSCH scheduling SCI may be used to determine LBT and/or CPE parameters). In some examples, the non-target receiver may determine a duration of COT 502 from COT-SI.

In some cases, a quantity of PSFCH occasions, such as a quantity of configurable PSFCH transmission occasions, may be used to address LBT uncertainty. A PSCCH or PSSCH transmission may have N associated candidate PSFCH occasions. The value of N may be, for example, 1, 2, 3, or 4, among other examples. When N is greater than 1 (N>1), candidate PSFCH occasions associated with a first PSCCH/PSSCH transmission may have different time and/or frequency resources than candidate PSFCH occasions associated with a second PSCCH/PSSCH transmission, for example, if the first PSCCH/PSSCH transmission and second PSCCH/PSSCH transmission are scheduled on non-overlapped resources.

Figure 6:
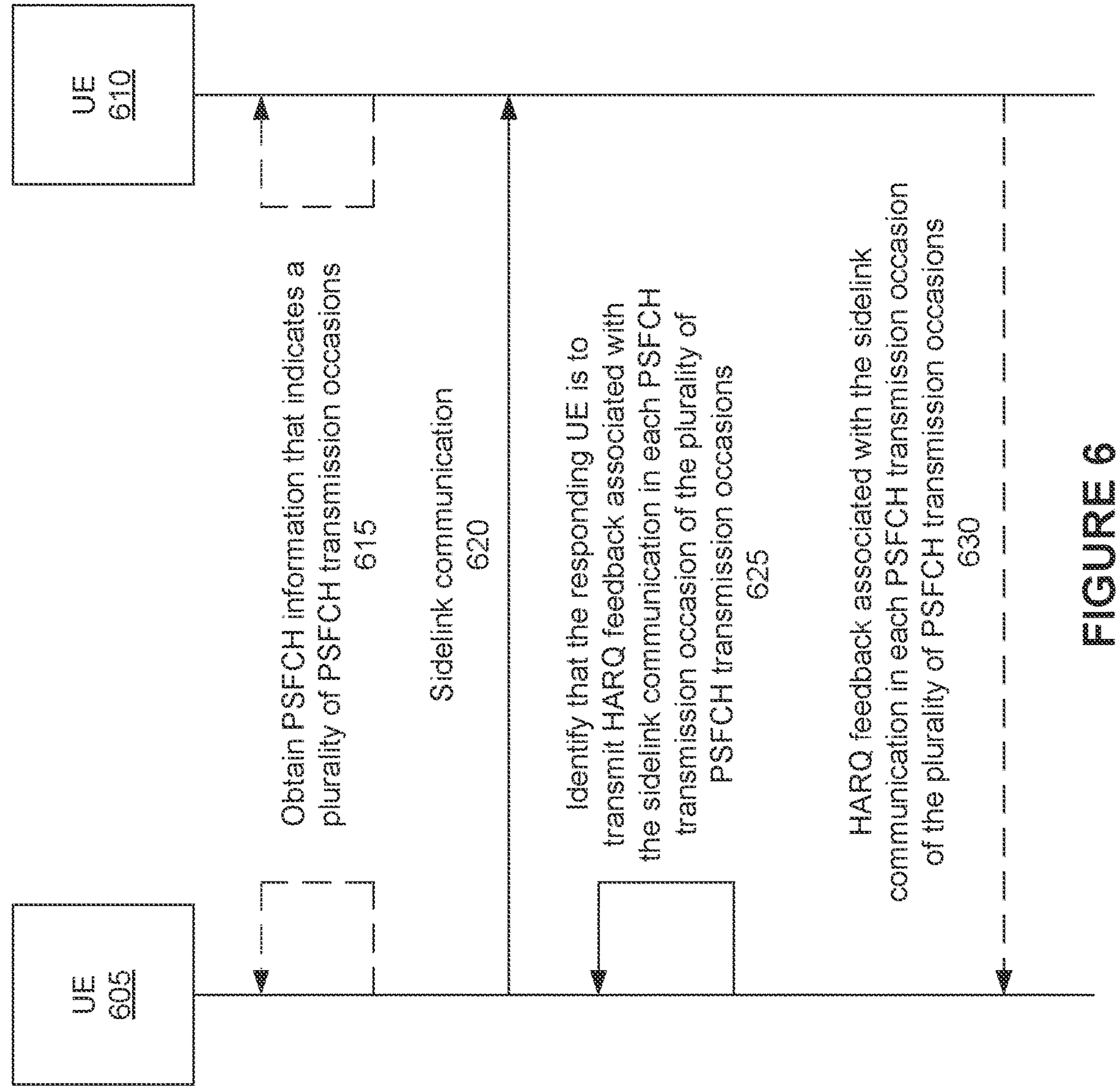
FIG. 6 is a diagram illustrating an example of PSFCH transmissions within PSFCH transmission occasions in accordance with the present disclosure.

FIG. 6 is a diagram illustrating an example 600 of PSFCH transmissions within PSFCH transmission occasions in accordance with the present disclosure. A UE 605 may communicate with a UE 610. In some aspects, the UE 605 may be a COT initiating UE and the UE 610 may be a responding UE.

As shown by reference number 615, the UE 605 and/or the UE 610 may obtain PSFCH information that indicates a plurality of PSFCH transmission occasions. In some aspects, the PSFCH information may indicate that the UE 610 is to transmit HARQ feedback in each PSFCH transmission occasion of the plurality of PSFCH transmission occasions.

As shown by reference number 620, the UE 605 may transmit, and the UE 610 may receive, a sidelink communication. For example, the UE 605 may transmit, and the UE 610 may receive, a PSCCH communication or a PSSCH communication that implicitly or explicitly requests HARQ feedback. The UE 605 may transmit the sidelink communication within a COT used for communications between the UE 605 and the UE 610.

As shown by reference number 625, the UE 605 may identify that the UE 610 is to transmit HARQ feedback in each PSFCH transmission occasion of the plurality of PSFCH transmission occasions. For example, the UE 605 may assume that the UE 610 will transmit HARQ feedback in each PSFCH transmission occasion of the plurality of PSFCH transmission occasions within the COT. Although a PSFCH transmission may be subject to LBT, the UE 605 may assume that the UE 605 has triggered or scheduled the UE 610 to perform PSFCH transmissions in all of the PSFCH transmission occasions within the COT.

As shown by reference number 630, the UE 610 may transmit, and the UE 605 may receive, HARQ feedback associated with the sidelink communication in each PSFCH transmission occasion of the plurality of PSFCH transmission occasions. For example, the UE 610 may transmit, and the UE 605 may receive, an ACK or a NACK in response to the sidelink communication in each PSFCH transmission occasion of the plurality of PSFCH transmission occasions.

Figure 7:
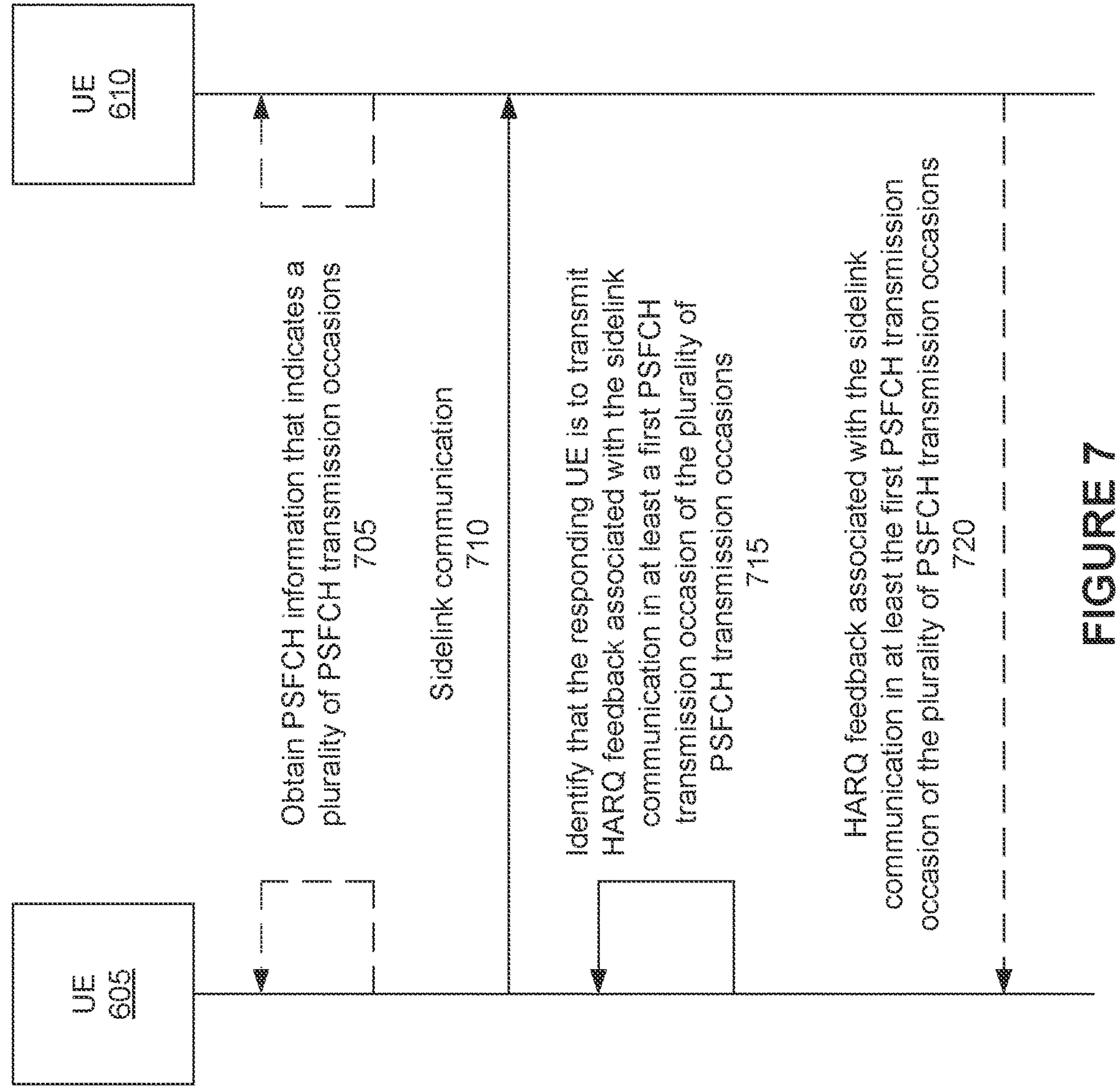
FIG. 7 is a diagram illustrating an example of PSFCH transmissions within PSFCH transmission occasions in accordance with the present disclosure.

FIG. 7 is a diagram illustrating an example 700 of PSFCH transmissions within PSFCH transmission occasions in accordance with the present disclosure.

As shown by reference number 705, the UE 605 and/or the UE 610 may obtain PSFCH information that indicates a plurality of PSFCH transmission occasions. The plurality of PSFCH transmission occasions may include N PSFCH transmission occasions. In some aspects, the PSFCH information may indicate that the UE 610 is to transmit HARQ feedback in at least a first PSFCH transmission occasion of the plurality of PSFCH transmission occasions.

As shown by reference number 710, the UE 605 may transmit, and the UE 610 may receive, a sidelink communication. For example, the UE 605 may transmit, and the UE 610 may receive, a PSCCH communication or a PSSCH communication that implicitly or explicitly requests HARQ feedback. The UE 605 may transmit the sidelink communication within a COT used for communications between the UE 605 and the UE 610.

As shown by reference number 715, the UE 605 may identify that the UE 610 is to transmit HARQ feedback in at least the first PSFCH transmission occasion of the plurality of PSFCH transmission occasions. For example, the UE 605 may assume that the UE 610 will transmit HARQ feedback in at least the first PSFCH transmission occasion of the plurality of PSFCH transmission occasions.

In some aspects, the UE 605 may identify that the UE 610 is not to transmit HARQ feedback at the remaining PSFCH transmission occasions (N−1) of the plurality of PSFCH transmission occasions. For example, the UE 605 may assume that the UE 610 will not transmit HARQ feedback at any of the remaining PSFCH transmission occasions within the COT that occur after the first PSFCH transmission occasion. Unless the UE 610 (or another UE) transmits HARQ feedback at the one or more remaining PSFCH transmission occasions, a padding signal may be needed if the UE 605 is to continue COT transmissions after the first PSFCH transmission occasion.

In some aspects, the UE 605 may identify that the UE 610 is to transmit HARQ feedback at one or more remaining PSFCH transmission occasions of the plurality of PSFCH transmission occasions until a target PSFCH transmission is received from the UE 610. For example, the UE 605 may assume that the UE 610 will transmit HARQ feedback at one or more remaining PSFCH transmission occasions that occur after the first PSFCH transmission occasion but before another PSFCH transmission occasion on which the target PSFCH transmission is received from the UE 610. After the UE 605 receives the target HARQ feedback at the other PSFCH transmission occasion, the UE 605 may identify that the UE 610 is not to transmit HARQ feedback at the remaining PSFCH transmission occasions that occur after the other PSFCH transmission occasion on which the target PSFCH transmission is received. Thus, the UE 605 may assume HARQ feedback transmissions on all PSFCH transmission occasions of the plurality of PSFCH transmission occasions up to the PSFCH transmission occasion on which the target HARQ feedback is received, and may not assume any HARQ feedback transmissions on all PSFCH transmission occasions of the plurality of PSFCH transmission occasions that occur after the PSFCH transmission occasion on which the target HARQ feedback is received. Unless the UE 610 (or another UE) transmits HARQ feedback on the one or more remaining PSFCH transmission occasions that occur after the PSFCH transmission occasion on which the target HARQ feedback is received, a padding signal may be needed if the UE 605 is to continue COT transmissions in the plurality of PSFCH transmission occasions that occur after the PSFCH transmission occasion on which the target HARQ feedback is received.

In some aspects, the UE 605 may determine that one or more padding signals are to be transmitted in one or more PSFCH transmission occasions for which the UE 605 cannot assume that HARQ feedback is to be transmitted by the UE 610. In some aspects, the UE 605 may transmit one or more padding signals in the one or more PSFCH transmission occasions for which the UE 605 cannot assume that HARQ feedback is to be transmitted. Additionally or alternatively, the UE 605 may trigger the UE 610 to transmit one or more padding signals in the one or more PSFCH transmission occasions for which the UE 605 cannot assume that HARQ feedback is to be transmitted. In a first example, the UE 605 may transmit the padding signal on a common interlace or on a reserved or unused PSFCH resource. Additionally or alternatively, the UE 610 may transmit the padding signal for all remaining PSFCH transmission occasions of the plurality of PSFCH transmission occasions that occur after the target PSFCH transmission is received by the UE 605. The UE 610 may transmit the padding signal on the common interlace or on the reserved or unused PSFCH resource. In a second example, the UE 605 may transmit SCI that indicates for the UE 610 to transmit one or more padding signals in one or more PSFCH transmission occasions that occur after the target PSFCH transmission is received by the UE 605. For example, the UE 605 may transmit, and the UE 610 may receive, SCI that indicates for the UE 610 to transmit padding signals in one or more remaining PSFCH transmission occasions that occur after the target PSFCH transmission is received by the UE 605. In some examples, the SCI may indicate for the UE 610 to transmit padding signals in all of the remaining PSFCH transmission occasions of the plurality of PSFCH transmission occasions that occur after the target PSFCH transmission is received by the UE 605. In some other examples, the SCI may indicate for the UE 610 to transmit padding signals in one or more select PSFCH transmission occasions of the plurality of PSFCH transmission occasions, such as Y contiguous PSFCH transmission occasions, that occur after the target PSFCH transmission is received by the UE 605.

As shown by reference number 720, the UE 610 may transmit, and the UE 605 may receive, HARQ feedback associated with the sidelink communication in at least the first PSFCH transmission occasion of the plurality of PSFCH transmission occasions. For example, the UE 610 may transmit, and the UE 605 may receive, an ACK or a NACK in response to the sidelink communication in one or more PSFCH transmissions that include at least the first PSFCH transmission occasion.

FIG. 8 is a flowchart illustrating an example process 800 performed, for example, by a UE that supports wireless communications in accordance with the present disclosure. Example process 800 is an example where the UE (for example, UE 120) performs operations associated with physical sidelink feedback channel transmissions.

As shown in FIG. 8, in some aspects, process 800 may include obtaining PSFCH information that indicates a plurality of PSFCH transmission occasions (block 810). For example, the UE (such as by using communication manager 140 or obtaining component 1208, depicted in FIG. 12) may obtain PSFCH information that indicates a plurality of PSFCH transmission occasions, as described above.

As further shown in FIG. 8, in some aspects, process 800 may include transmitting, to a responding UE, a sidelink communication (block 820). For example, the UE (such as by using communication manager 140 or transmission component 1204, depicted in FIG. 12) may transmit, to a responding UE, a sidelink communication, as described above.

As further shown in FIG. 8, in some aspects, process 800 may include receiving, in accordance with the PSFCH information indicating that the responding UE is to transmit HARQ feedback associated with the sidelink communication in each PSFCH transmission occasion of the plurality of PSFCH transmission occasions, the HARQ feedback associated with the sidelink communication in each PSFCH transmission occasion of the plurality of PSFCH transmission occasions (block 830). For example, the UE (such as by using communication manager 140 or reception component 1202, depicted in FIG. 12) may receive, in accordance with the PSFCH information indicating that the responding UE is to transmit HARQ feedback associated with the sidelink communication in each PSFCH transmission occasion of the plurality of PSFCH transmission occasions, the HARQ feedback associated with the sidelink communication in each PSFCH transmission occasion of the plurality of PSFCH transmission occasions, as described above.

Process 800 may include additional aspects, such as any single aspect or any combination of aspects described below or in connection with one or more other processes described elsewhere herein.

In a first additional aspect, the PSFCH information indicates that the responding UE is to transmit the HARQ feedback in each transmission occasion of the plurality of PSFCH transmission occasions.

In a second additional aspect, alone or in combination with the first aspect, the plurality of PSFCH transmission occasions correspond to all PSFCH transmission occasions within a channel occupancy time for communicating with the responding UE.

In a third additional aspect, alone or in combination with one or more of the first and second aspects, process 800 includes receiving, from the responding UE, the HARQ feedback in each PSFCH transmission occasion of the plurality of PSFCH transmission occasions.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

FIG. 9 is a flowchart illustrating an example process 900 performed, for example, by a UE that supports wireless communications in accordance with the present disclosure. Example process 900 is an example where the UE (for example, UE 120) performs operations associated with physical sidelink feedback channel transmissions.

As shown in FIG. 9, in some aspects, process 900 may include obtaining PSFCH information that indicates a plurality of PSFCH transmission occasions (block 910). For example, the UE (such as by using communication manager 140 or obtaining component 1308, depicted in FIG. 13) may obtain PSFCH information that indicates a plurality of PSFCH transmission occasions, as described above.

As further shown in FIG. 9, in some aspects, process 900 may include transmitting, to a responding UE, a sidelink communication (block 920). For example, the UE (such as by using communication manager 140 or transmission component 1304, depicted in FIG. 13) may transmit, to a responding UE, a sidelink communication, as described above.

As further shown in FIG. 9, in some aspects, process 900 may include receiving, in accordance with the PSFCH information indicating that the responding UE is to transmit HARQ feedback associated with the sidelink communication in at least a first PSFCH transmission occasion of the plurality of PSFCH transmission occasions, the HARQ feedback associated with the sidelink communication in at least the first PSFCH transmission occasion of the plurality of PSFCH transmission occasions (block 930). For example, the UE (such as by using communication manager 140 or reception component 1302, depicted in FIG. 13) may receive, in accordance with the PSFCH information indicating that the responding UE is to transmit HARQ feedback associated with the sidelink communication in at least a first PSFCH transmission occasion of the plurality of PSFCH transmission occasions, the HARQ feedback associated with the sidelink communication in each PSFCH transmission occasion of the plurality of PSFCH transmission occasions, as described above.

Process 900 may include additional aspects, such as any single aspect or any combination of aspects described below or in connection with one or more other processes described elsewhere herein.

In a first additional aspect, the PSFCH information indicates that the responding UE is to transmit HARQ feedback in a PSFCH transmission occasion of the plurality of PSFCH transmission occasions in accordance with the responding UE failing to transmit HARQ feedback in a previous PSFCH transmission occasion due to a listen-before-talk failure.

In a second additional aspect, alone or in combination with the first aspect, process 900 includes identifying, in accordance with the PSFCH information, that the responding UE is not to transmit HARQ feedback in all subsequent PSFCH transmission occasions of the plurality of PSFCH transmission occasions that are after the first PSFCH transmission occasion.

In a third additional aspect, alone or in combination with one or more of the first and second aspects, process 900 includes identifying, in accordance with the PSFCH information, that the responding UE is to transmit HARQ feedback in one or more subsequent PSFCH transmission occasions that are after the first PSFCH transmission occasion and that are prior to a second PSFCH transmission occasion in which the initiating UE receives a target HARQ feedback from the responding UE.

In a fourth additional aspect, alone or in combination with one or more of the first through third aspects, process 900 includes identifying, in accordance with receiving the target HARQ feedback from the responding UE in the second PSFCH transmission occasion, that the responding UE is not to transmit HARQ feedback in all subsequent PSFCH transmission occasions of the plurality of PSFCH transmission occasions that are after the second PSFCH transmission occasion.

In a fifth additional aspect, alone or in combination with one or more of the first through fourth aspects, process 900 includes communicating one or more padding signals in accordance with identifying that the responding UE is not to transmit HARQ feedback in one or more subsequent PSFCH transmission occasions that are after the first PSFCH transmission occasion.

In a sixth additional aspect, alone or in combination with one or more of the first through fifth aspects, communicating the one or more padding signals comprises transmitting, to the responding UE, one or more padding signals corresponding to the one or more subsequent PSFCH transmission occasions that are after the first PSFCH transmission occasion.

In a seventh additional aspect, alone or in combination with one or more of the first through sixth aspects, transmitting the one or more padding signals corresponding to the one or more subsequent PSFCH transmission occasions that are after the first PSFCH transmission occasion comprises transmitting the one or more padding signals in at least one of a common interlace, a reserved PSFCH resource, or an unused PSFCH resource.

In an eighth additional aspect, alone or in combination with one or more of the first through seventh aspects, communicating the one or more padding signals comprises transmitting, to the responding UE, a padding signal indication that indicates for the responding UE to transmit the one or more padding signals to the initiating UE.

In a ninth additional aspect, alone or in combination with one or more of the first through eighth aspects, transmitting the padding signal indication comprises transmitting, to the responding UE, an indication for the responding UE to transmit one or more padding signals corresponding to all subsequent PSFCH transmission occasions that are after the first PSFCH transmission occasion.

In a tenth additional aspect, alone or in combination with one or more of the first through ninth aspects, transmitting the padding signal indication comprises transmitting, to the responding UE, an indication for the responding UE to transmit the one or more padding signals in accordance with sidelink control information.

In an eleventh additional aspect, alone or in combination with one or more of the first through tenth aspects, process 900 includes transmitting, to the responding UE, sidelink control information that indicates whether the responding UE is to transmit one or more padding signals corresponding to one or more subsequent PSFCH transmission occasions that are after the first PSFCH transmission occasion.

In a twelfth additional aspect, alone or in combination with one or more of the first through eleventh aspects, transmitting the sidelink control information that indicates whether the responding UE is to transmit the one or more padding signals comprises transmitting sidelink control information that indicates for the responding UE to transmit one or more padding signals corresponding to a subset of the PSFCH transmission occasions that are after the first PSFCH transmission occasion.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

Figure 10:
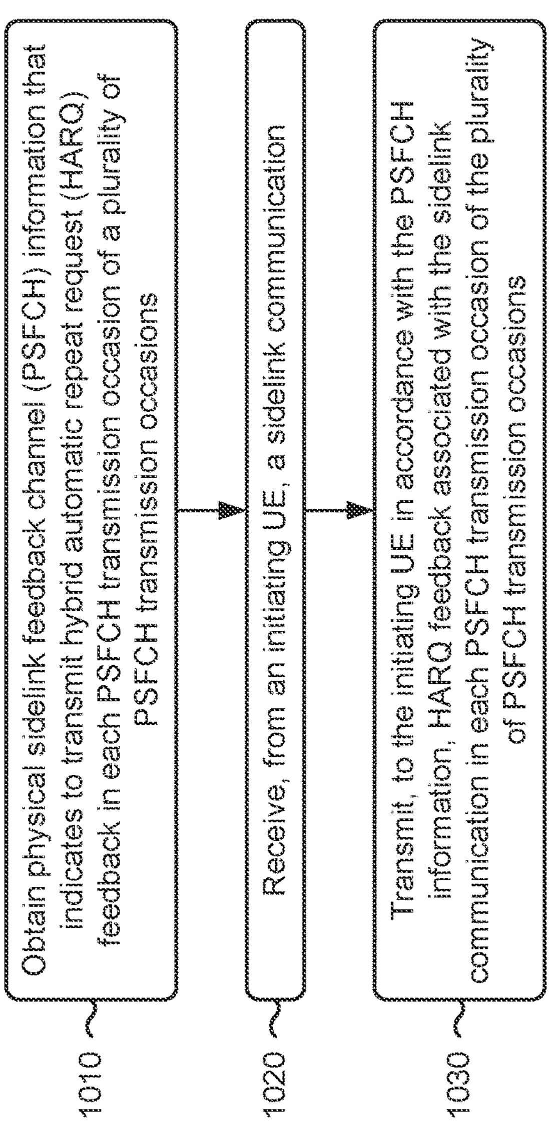
FIG. 10 is a flowchart illustrating an example process for PSFCH transmission in each PSFCH transmission occasion of a plurality of PSFCH transmission occasions performed, for example, by a responding UE in accordance with the present disclosure.

FIG. 10 is a flowchart illustrating an example process 1000 performed, for example, by a UE that supports wireless communications in accordance with the present disclosure. Example process 1000 is an example where the UE (for example, UE 120) performs operations associated with physical sidelink feedback channel transmissions.

As shown in FIG. 10, in some aspects, process 1000 may include obtaining PSFCH information that indicates for transmission of HARQ feedback in each PSFCH transmission occasion of a plurality of PSFCH transmission occasions (block 1010). For example, the UE (such as by using communication manager 140 or obtaining component 1408, depicted in FIG. 14) may obtain PSFCH information that indicates for transmission of HARQ feedback in each PSFCH transmission occasion of a plurality of PSFCH transmission occasions, as described above.

As further shown in FIG. 10, in some aspects, process 1000 may include receiving, from an initiating UE, a sidelink communication (block 1020). For example, the UE (such as by using communication manager 140 or reception component 1402, depicted in FIG. 14) may receive, from an initiating UE, a sidelink communication, as described above.

As further shown in FIG. 10, in some aspects, process 1000 may include transmitting, to the initiating UE in accordance with the PSFCH information, HARQ feedback associated with the sidelink communication in each PSFCH transmission occasion of the plurality of PSFCH transmission occasions (block 1030). For example, the UE (such as by using communication manager 140 or transmission component 1404, depicted in FIG. 14) may transmit, to the initiating UE in accordance with the PSFCH information, HARQ feedback associated with the sidelink communication in each PSFCH transmission occasion of the plurality of PSFCH transmission occasions, as described above.

Process 1000 may include additional aspects, such as any single aspect or any combination of aspects described below or in connection with one or more other processes described elsewhere herein.

In a first additional aspect, the plurality of PSFCH transmission occasions correspond to all PSFCH transmission occasions within a channel occupancy time for communicating with the initiating UE.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

FIG. 11 is a flowchart illustrating an example process 1100 performed, for example, by a UE that supports wireless communications in accordance with the present disclosure. Example process 1100 is an example where the UE (for example, UE 120) performs operations associated with physical sidelink feedback channel transmissions.

As shown in FIG. 11, in some aspects, process 1100 may include obtaining PSFCH information that indicates for transmission of HARQ feedback in at least a first PSFCH transmission occasion of a plurality of PSFCH transmission occasions (block 1110). For example, the UE (such as by using communication manager 140 or obtaining component 1508, depicted in FIG. 15) may obtain PSFCH information that indicates for transmission of HARQ feedback in at least a first PSFCH transmission occasion of a plurality of PSFCH transmission occasions, as described above.

As further shown in FIG. 11, in some aspects, process 1100 may include receiving, from an initiating UE, a sidelink communication (block 1120). For example, the UE (such as by using communication manager 140 or reception component 1502, depicted in FIG. 15) may receive, from an initiating UE, a sidelink communication, as described above.

As further shown in FIG. 11, in some aspects, process 1100 may include transmitting, to the initiating UE in accordance with the PSFCH information, HARQ feedback associated with the sidelink communication in at least the first PSFCH transmission occasion of the plurality of PSFCH transmission occasions (block 1130). For example, the UE (such as by using communication manager 140 or transmission component 1504, depicted in FIG. 15) may transmit, to the initiating UE in accordance with the PSFCH information, HARQ feedback associated with the sidelink communication in at least the first PSFCH transmission occasion of the plurality of PSFCH transmission occasions, as described above.

Process 1100 may include additional aspects, such as any single aspect or any combination of aspects described below or in connection with one or more other processes described elsewhere herein.

In a first additional aspect, transmitting the HARQ feedback in at least the first PSFCH transmission occasion comprises transmitting the HARQ feedback in at least the first PSFCH transmission occasion in accordance with failing to transmit HARQ feedback in a previous PSFCH transmission occasion due to a listen-before-talk failure.

In a second additional aspect, alone or in combination with the first aspect, process 1100 includes receiving, from the initiating UE, an indication not to transmit HARQ feedback in all subsequent PSFCH transmission occasions of the plurality of PSFCH transmission occasions that are after the first PSFCH transmission occasion.

In a third additional aspect, alone or in combination with one or more of the first and second aspects, process 1100 includes receiving, from the initiating UE, an indication to transmit HARQ feedback in one or more subsequent PSFCH transmission occasions that are after the first PSFCH transmission occasion and that are prior to a second PSFCH transmission occasion that is used by the responding UE for transmitting a target HARQ feedback.

In a fourth additional aspect, alone or in combination with one or more of the first through third aspects, process 1100 includes receiving, from the initiating UE, after transmitting the target HARQ feedback, an indication not to transmit HARQ feedback in all subsequent PSFCH transmission occasions of the plurality of PSFCH transmission occasions that are after the second PSFCH transmission occasion.

In a fifth additional aspect, alone or in combination with one or more of the first through fourth aspects, process 1100 includes receiving, from the initiating UE, one or more padding signals corresponding to one or more subsequent PSFCH transmission occasions that are after the first PSFCH transmission occasion.

In a sixth additional aspect, alone or in combination with one or more of the first through fifth aspects, receiving the one or more padding signals corresponding to the one or more subsequent PSFCH transmission occasions that are after the first PSFCH transmission occasion comprises receiving the one or more padding signals in at least one of a common interlace, a reserved PSFCH resource, or an unused PSFCH resource.

In a seventh additional aspect, alone or in combination with one or more of the first through sixth aspects, process 1100 includes receiving, from the initiating UE, a padding signal indication that indicates for the responding UE to transmit one or more padding signals to the initiating UE.

In an eighth additional aspect, alone or in combination with one or more of the first through seventh aspects, receiving the padding signal indication comprises receiving, from the initiating UE, an indication to transmit one or more padding signals corresponding to all subsequent PSFCH transmission occasions that are after the first PSFCH transmission occasion.

In a ninth additional aspect, alone or in combination with one or more of the first through eighth aspects, receiving the padding signal indication comprises receiving, from the initiating UE, an indication to transmit the one or more padding signals in accordance with sidelink control information.

In a tenth additional aspect, alone or in combination with one or more of the first through ninth aspects, process 1100 includes receiving, from the initiating UE, sidelink control information that indicates whether the responding UE is to transmit one or more padding signals corresponding to one or more subsequent PSFCH transmission occasions that are after the first PSFCH transmission occasion.

In an eleventh additional aspect, alone or in combination with one or more of the first through tenth aspects, receiving the sidelink control information that indicates whether the responding UE is to transmit the one or more padding signals comprises receiving sidelink control information that indicates for the responding UE to transmit one or more padding signals corresponding to a subset of the PSFCH transmission occasions that are after the first PSFCH transmission occasion.

Although FIG. 11 shows example blocks of process 1100, in some aspects, process 1100 may include additional blocks, fewer blocks, different blocks, or differently arranged blocks than those depicted in FIG. 11. Additionally or alternatively, two or more of the blocks of process 1100 may be performed in parallel.

Figure 12:
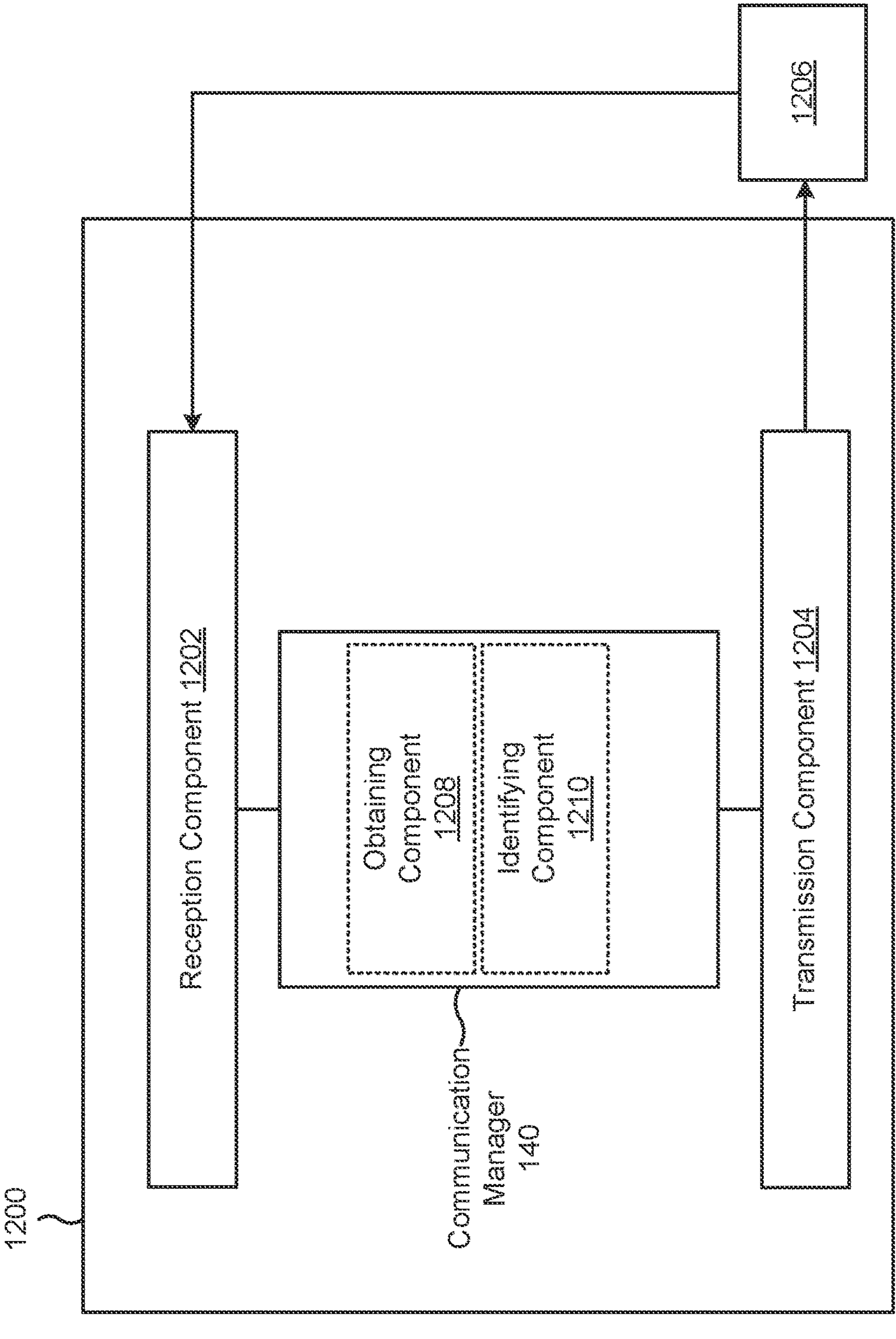
FIG. 12 is a diagram of an example initiating UE that supports PSFCH transmission in each PSFCH transmission occasion of a plurality of PSFCH transmission occasions in accordance with the present disclosure.

FIG. 12 is a diagram of an example apparatus 1200 for wireless communication that supports wireless communication in accordance with the present disclosure. The apparatus 1200 may be a initiating UE, or a initiating UE may include the apparatus 1200. In some aspects, the apparatus 1200 includes a reception component 1202, a transmission component 1204, and a communication manager 140, which may be in communication with one another (for example, via one or more buses). As shown, the apparatus 1200 may communicate with another apparatus 1206 (such as a UE, a network node, or another wireless communication device) using the reception component 1202 and the transmission component 1204.

In some aspects, the apparatus 1200 may be configured to and/or operable to perform one or more operations described herein in connection with FIGS. 6-7. Additionally or alternatively, the apparatus 1200 may be configured to and/or operable to perform one or more processes described herein, such as process 800 of FIG. 8, and/or process 900 of FIG. 9. In some aspects, the apparatus 1200 may include one or more components of the initiating UE described above in connection with FIG. 2.

The reception component 1202 may receive communications, such as reference signals, control information, and/or data communications, from the apparatus 1206. The reception component 1202 may provide received communications to one or more other components of the apparatus 1200, such as the communication manager 140. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a modem, a demodulator, a MIMO detector, a receive processor, a controller/processor, and/or a memory of the initiating UE described above in connection with FIG. 2.

The transmission component 1204 may transmit communications, such as reference signals, control information, and/or data communications, to the apparatus 1206. In some aspects, the communication manager 140 may generate communications and may transmit the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, and/or a memory of the initiating UE described above in connection with FIG. 2. In some aspects, the transmission component 1204 may be co-located with the reception component 1202 in a transceiver.

The communication manager 140 may obtain PSFCH information that indicates a plurality of PSFCH transmission occasions. The communication manager 140 may transmit or may cause the transmission component 1204 to transmit, to a responding UE, a sidelink communication. The communication manager 140 may receive, in accordance with the PSFCH information indicating that the responding UE is to transmit HARQ feedback associated with the sidelink communication in each PSFCH transmission occasion of the plurality of PSFCH transmission occasions, the HARQ feedback associated with the sidelink communication in each PSFCH transmission occasion of the plurality of PSFCH transmission occasions. In some aspects, the communication manager 140 may perform one or more operations described elsewhere herein as being performed by one or more components of the communication manager 140.

The communication manager 140 may include a controller/processor and/or a memory of the initiating UE described above in connection with FIG. 2. In some aspects, the communication manager 140 includes a set of components, such as an obtaining component 1208 and/or an identifying component 1210. Alternatively, the set of components may be separate and distinct from the communication manager 140. In some aspects, one or more components of the set of components may include or may be implemented within a controller/processor and/or a memory of the initiating UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The obtaining component 1208 may obtain PSFCH information that indicates a plurality of PSFCH transmission occasions. The transmission component 1204 may transmit, to a responding UE, a sidelink communication. The identifying component 1210 may identify, in accordance with the PSFCH information, that the responding UE is to transmit HARQ feedback associated with the sidelink communication in each PSFCH transmission occasion of the plurality of PSFCH transmission occasions. The reception component 1202 may receive, from the responding UE, the HARQ feedback in each PSFCH transmission occasion of the plurality of PSFCH transmission occasions.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
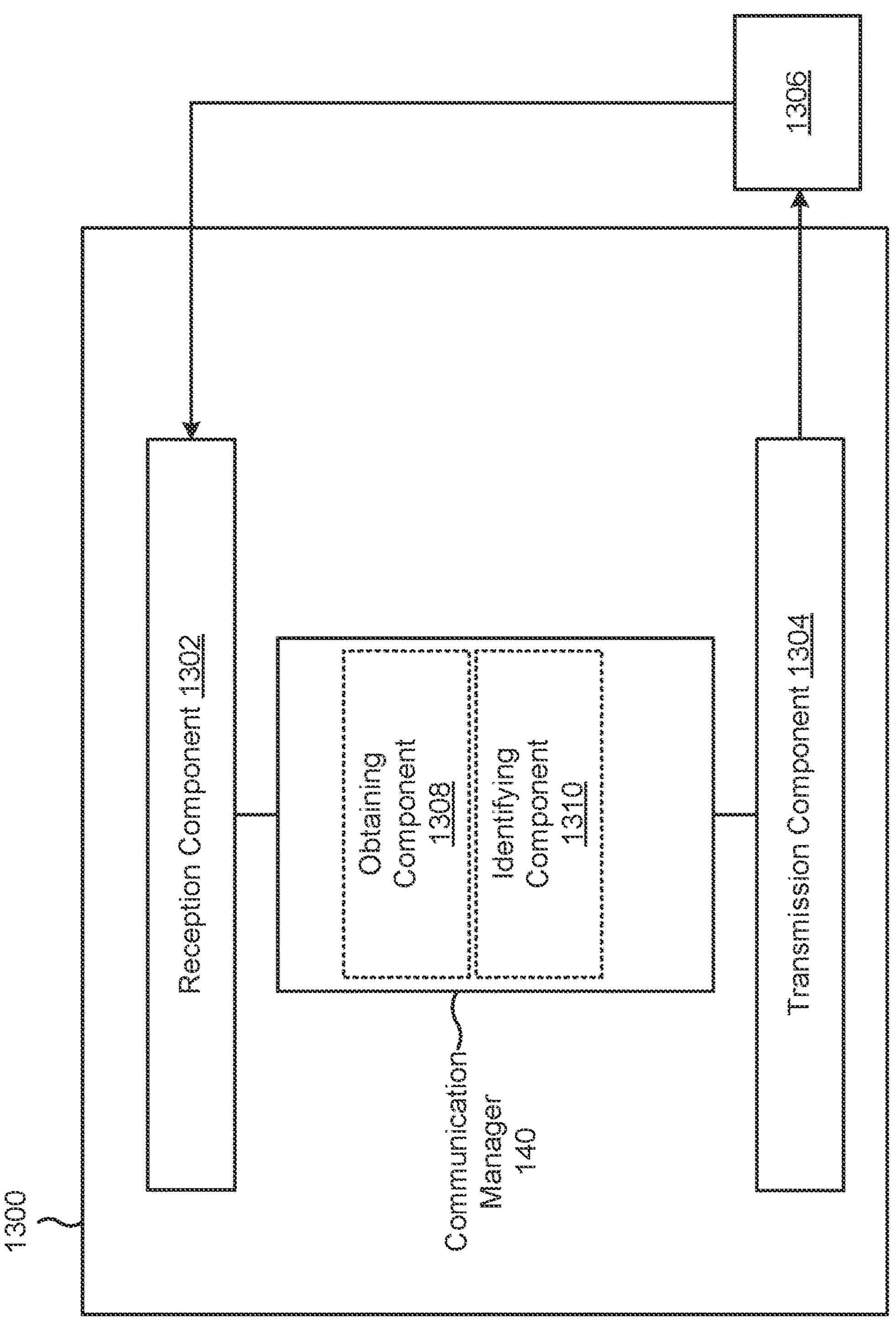
FIG. 13 is a diagram of an example responding UE that supports for PSFCH transmission in at least a first PSFCH transmission occasion of a plurality of PSFCH transmission occasions wireless communication in accordance with the present disclosure.

FIG. 13 is a diagram of an example apparatus 1300 for wireless communication that supports wireless communication in accordance with the present disclosure. The apparatus 1300 may be a initiating UE, or a initiating UE may include the apparatus 1300. In some aspects, the apparatus 1300 includes a reception component 1302, a transmission component 1304, and a communication manager 140, which may be in communication with one another (for example, via one or more buses). As shown, the apparatus 1300 may communicate with another apparatus 1306 (such as a UE, a network node, or another wireless communication device) using the reception component 1302 and the transmission component 1304.

In some aspects, the apparatus 1300 may be configured to and/or operable to perform one or more operations described herein in connection with FIGS. 6-7. Additionally or alternatively, the apparatus 1300 may be configured to and/or operable to perform one or more processes described herein, such as process 800 of FIG. 8, and/or process 900 of FIG. 9. In some aspects, the apparatus 1300 may include one or more components of the initiating UE described above in connection with FIG. 2.

The reception component 1302 may receive communications, such as reference signals, control information, and/or data communications, from the apparatus 1306. The reception component 1302 may provide received communications to one or more other components of the apparatus 1300, such as the communication manager 140. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1302 may include one or more antennas, a modem, a demodulator, a MIMO detector, a receive processor, a controller/processor, and/or a memory of the initiating UE described above in connection with FIG. 2.

The transmission component 1304 may transmit communications, such as reference signals, control information, and/or data communications, to the apparatus 1306. In some aspects, the communication manager 140 may generate communications and may transmit the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, and/or a memory of the initiating UE described above in connection with FIG. 2. In some aspects, the transmission component 1304 may be co-located with the reception component 1302 in a transceiver.

The communication manager 140 may obtain PSFCH information that indicates a plurality of PSFCH transmission occasions. The communication manager 140 may transmit or may cause the transmission component 1304 to transmit, to a responding UE, a sidelink communication. The communication manager 140 may receive, in accordance with the PSFCH information indicating that the responding UE is to transmit HARQ feedback associated with the sidelink communication in at least a first PSFCH transmission occasion of the plurality of PSFCH transmission occasions, the HARQ feedback associated with the sidelink communication in at least the first PSFCH transmission occasion of the plurality of PSFCH transmission occasions. In some aspects, the communication manager 140 may perform one or more operations described elsewhere herein as being performed by one or more components of the communication manager 140.

The communication manager 140 may include a controller/processor and/or a memory of the initiating UE described above in connection with FIG. 2. In some aspects, the communication manager 140 includes a set of components, such as an obtaining component 1308 and/or an identifying component 1310. Alternatively, the set of components may be separate and distinct from the communication manager 140. In some aspects, one or more components of the set of components may include or may be implemented within a controller/processor and/or a memory of the initiating UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The obtaining component 1308 may obtain PSFCH information that indicates a plurality of PSFCH transmission occasions. The transmission component 1304 may transmit, to a responding UE, a sidelink communication. The identifying component 1310 may identify, in accordance with the PSFCH information, that the responding UE is to transmit HARQ feedback associated with the sidelink communication in at least a first PSFCH transmission occasion of the plurality of PSFCH transmission occasions. The reception component 1302 may receive, from the responding UE, the HARQ feedback in at least the first PSFCH transmission occasion of the plurality of PSFCH transmission occasions.

The identifying component 1310 may identify, in accordance with the PSFCH information, that the responding UE is not to transmit HARQ feedback in all subsequent PSFCH transmission occasions of the plurality of PSFCH transmission occasions that are after the first PSFCH transmission occasion. The identifying component 1310 may identify, in accordance with the PSFCH information, that the responding UE is to transmit HARQ feedback in one or more subsequent PSFCH transmission occasions that are after the first PSFCH transmission occasion and that are prior to a second PSFCH transmission occasion in which the initiating UE receives a target HARQ feedback from the responding UE. The identifying component 1310 may identify, in accordance with receiving the target HARQ feedback from the responding UE in the second PSFCH transmission occasion, that the responding UE is not to transmit HARQ feedback in all subsequent PSFCH transmission occasions of the plurality of PSFCH transmission occasions that are after the second PSFCH transmission occasion. The reception component 1302 and/or the transmission component 1304 may communicate one or more padding signals in accordance with identifying that the responding UE is not to transmit HARQ feedback in one or more subsequent PSFCH transmission occasions that are after the first PSFCH transmission occasion.

The transmission component 1304 may transmit, to the responding UE, sidelink control information that indicates whether the responding UE is to transmit one or more padding signals corresponding to one or more subsequent PSFCH transmission occasions that are after the first PSFCH transmission occasion.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

Figure 14:
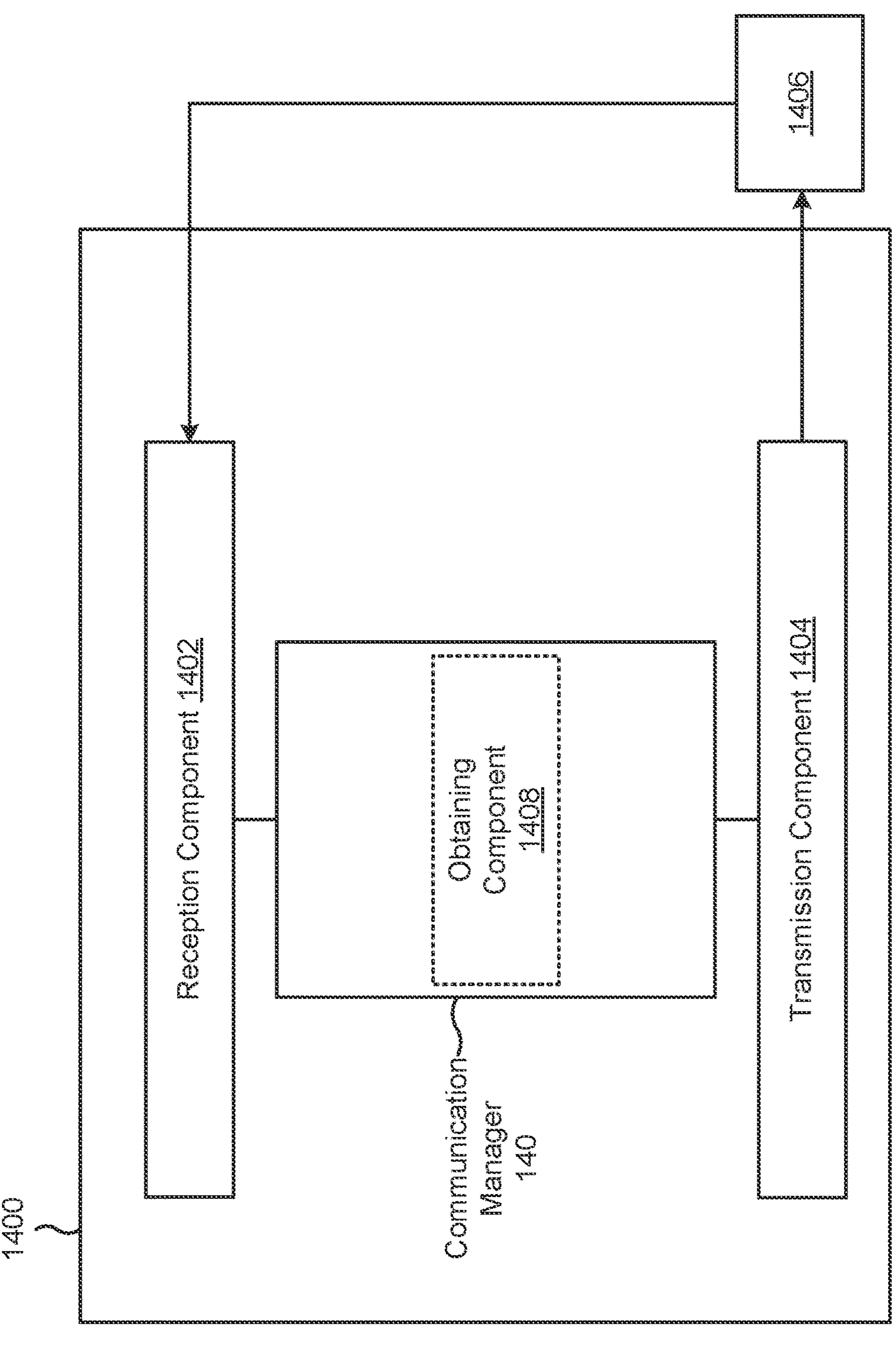
FIG. 14 is a diagram of an example responding UE that supports PSFCH transmission in each PSFCH transmission occasion of a plurality of PSFCH transmission occasions in accordance with the present disclosure.

FIG. 14 is a diagram of an example apparatus 1400 for wireless communication that supports wireless communication in accordance with the present disclosure. The apparatus 1400 may be a responding UE, or a responding UE may include the apparatus 1400. In some aspects, the apparatus 1400 includes a reception component 1402, a transmission component 1404, and a communication manager 140, which may be in communication with one another (for example, via one or more buses). As shown, the apparatus 1400 may communicate with another apparatus 1406 (such as a UE, a network node, or another wireless communication device) using the reception component 1402 and the transmission component 1404.

In some aspects, the apparatus 1400 may be configured to and/or operable to perform one or more operations described herein in connection with FIGS. 6-7. Additionally or alternatively, the apparatus 1400 may be configured to and/or operable to perform one or more processes described herein, such as process 1000 of FIG. 10, and/or process 1100 of FIG. 11. In some aspects, the apparatus 1400 may include one or more components of the responding UE described above in connection with FIG. 2.

The reception component 1402 may receive communications, such as reference signals, control information, and/or data communications, from the apparatus 1406. The reception component 1402 may provide received communications to one or more other components of the apparatus 1400, such as the communication manager 140. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1402 may include one or more antennas, a modem, a demodulator, a MIMO detector, a receive processor, a controller/processor, and/or a memory of the responding UE described above in connection with FIG. 2.

The transmission component 1404 may transmit communications, such as reference signals, control information, and/or data communications, to the apparatus 1406. In some aspects, the communication manager 140 may generate communications and may transmit the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, and/or a memory of the responding UE described above in connection with FIG. 2. In some aspects, the transmission component 1404 may be co-located with the reception component 1402 in a transceiver.

The communication manager 140 may obtain PSFCH information that indicates for transmission of HARQ feedback in each PSFCH transmission occasion of a plurality of PSFCH transmission occasions. The communication manager 140 may receive or may cause the reception component 1402 to receive, from an initiating UE, a sidelink communication. The communication manager 140 may transmit or may cause the transmission component 1404 to transmit, to the initiating UE in accordance with the PSFCH information, HARQ feedback associated with the sidelink communication in each PSFCH transmission occasion of the plurality of PSFCH transmission occasions. In some aspects, the communication manager 140 may perform one or more operations described elsewhere herein as being performed by one or more components of the communication manager 140.

The communication manager 140 may include a controller/processor and/or a memory of the responding UE described above in connection with FIG. 2. In some aspects, the communication manager 140 includes a set of components, such as an obtaining component 1408. Alternatively, the set of components may be separate and distinct from the communication manager 140. In some aspects, one or more components of the set of components may include or may be implemented within a controller/processor and/or a memory of the responding UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The obtaining component 1408 may obtain PSFCH information that indicates for transmission of HARQ feedback in each PSFCH transmission occasion of a plurality of PSFCH transmission occasions. The reception component 1402 may receive, from an initiating UE, a sidelink communication. The transmission component 1404 may transmit, to the initiating UE in accordance with the PSFCH information, HARQ feedback associated with the sidelink communication in each PSFCH transmission occasion of the plurality of PSFCH transmission occasions.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

Figure 15:
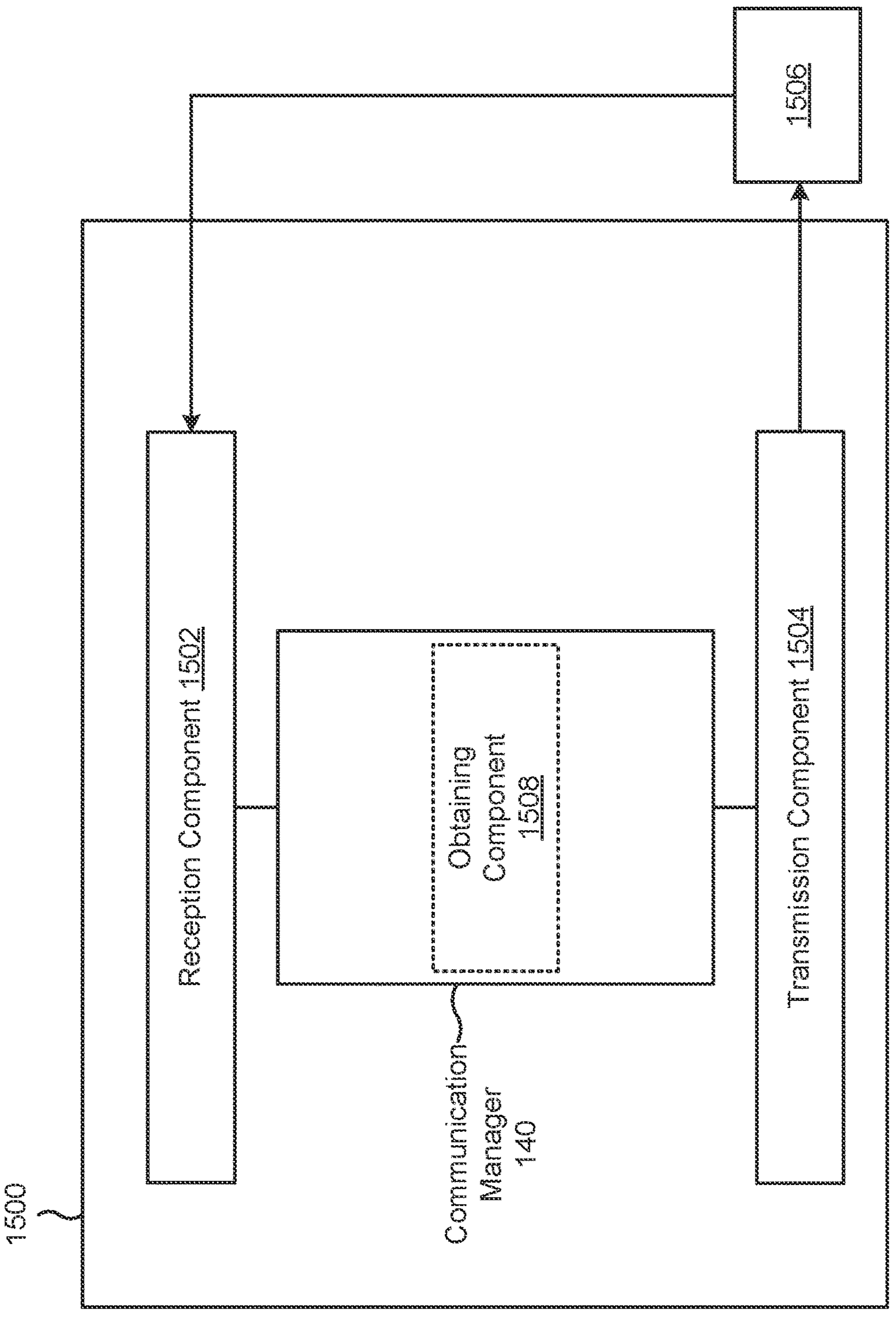
FIG. 15 is a diagram of an example responding UE that supports for PSFCH transmission in at least a first PSFCH transmission occasion of a plurality of PSFCH transmission occasions in accordance with the present disclosure.

FIG. 15 is a diagram of an example apparatus 1500 for wireless communication that supports wireless communication in accordance with the present disclosure. The apparatus 1500 may be a responding UE, or a responding UE may include the apparatus 1500. In some aspects, the apparatus 1500 includes a reception component 1502, a transmission component 1504, and a communication manager 140, which may be in communication with one another (for example, via one or more buses). As shown, the apparatus 1500 may communicate with another apparatus 1506 (such as a UE, a network node, or another wireless communication device) using the reception component 1502 and the transmission component 1504.

In some aspects, the apparatus 1500 may be configured to and/or operable to perform one or more operations described herein in connection with FIGS. 6-7. Additionally or alternatively, the apparatus 1500 may be configured to and/or operable to perform one or more processes described herein, such as process 1000 of FIG. 10, and/or process 1100 of FIG. 11. In some aspects, the apparatus 1500 may include one or more components of the responding UE described above in connection with FIG. 2.

The reception component 1502 may receive communications, such as reference signals, control information, and/or data communications, from the apparatus 1506. The reception component 1502 may provide received communications to one or more other components of the apparatus 1500, such as the communication manager 140. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1502 may include one or more antennas, a modem, a demodulator, a MIMO detector, a receive processor, a controller/processor, and/or a memory of the responding UE described above in connection with FIG. 2.

The transmission component 1504 may transmit communications, such as reference signals, control information, and/or data communications, to the apparatus 1506. In some aspects, the communication manager 140 may generate communications and may transmit the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, and/or a memory of the responding UE described above in connection with FIG. 2. In some aspects, the transmission component 1504 may be co-located with the reception component 1502 in a transceiver.

The communication manager 140 may obtain PSFCH information that indicates for transmission of HARQ feedback in at least a first PSFCH transmission occasion of a plurality of PSFCH transmission occasions. The communication manager 140 may receive or may cause the reception component 1502 to receive, from an initiating UE, a sidelink communication. The communication manager 140 may transmit or may cause the transmission component 1504 to transmit, to the initiating UE in accordance with the PSFCH information, HARQ feedback associated with the sidelink communication in at least the first PSFCH transmission occasion of the plurality of PSFCH transmission occasions. In some aspects, the communication manager 140 may perform one or more operations described elsewhere herein as being performed by one or more components of the communication manager 140.

The communication manager 140 may include a controller/processor and/or a memory of the responding UE described above in connection with FIG. 2. In some aspects, the communication manager 140 includes a set of components, such as an obtaining component 1508. Alternatively, the set of components may be separate and distinct from the communication manager 140. In some aspects, one or more components of the set of components may include or may be implemented within a controller/processor and/or a memory of the responding UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The obtaining component 1508 may obtain PSFCH information that indicates for transmission of HARQ feedback in at least a first PSFCH transmission occasion of a plurality of PSFCH transmission occasions. The reception component 1502 may receive, from an initiating UE, a sidelink communication. The transmission component 1504 may transmit, to the initiating UE in accordance with the PSFCH information, HARQ feedback associated with the sidelink communication in at least the first PSFCH transmission occasion of the plurality of PSFCH transmission occasions.

The reception component 1502 may receive, from the initiating UE, an indication not to transmit HARQ feedback in all subsequent PSFCH transmission occasions of the plurality of PSFCH transmission occasions that are after the first PSFCH transmission occasion. The reception component 1502 may receive, from the initiating UE, an indication to transmit HARQ feedback in one or more subsequent PSFCH transmission occasions that are after the first PSFCH transmission occasion and that are prior to a second PSFCH transmission occasion that is used by the responding UE for transmitting a target HARQ feedback. The reception component 1502 may receive, from the initiating UE, after transmitting the target HARQ feedback, an indication not to transmit HARQ feedback in all subsequent PSFCH transmission occasions of the plurality of PSFCH transmission occasions that are after the second PSFCH transmission occasion. The reception component 1502 may receive, from the initiating UE, one or more padding signals corresponding to one or more subsequent PSFCH transmission occasions that are after the first PSFCH transmission occasion. The reception component 1502 may receive, from the initiating UE, a padding signal indication that indicates for the responding UE to transmit one or more padding signals to the initiating UE. The reception component 1502 may receive, from the initiating UE, sidelink control information that indicates whether the responding UE is to transmit one or more padding signals corresponding to one or more subsequent PSFCH transmission occasions that are after the first PSFCH transmission occasion.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed at an initiating user equipment (UE), comprising: obtaining physical sidelink feedback channel (PSFCH) information that indicates a plurality of PSFCH transmission occasions; transmitting, to a responding UE, a sidelink communication; and receiving, in accordance with the PSFCH information indicating that the responding UE is to transmit hybrid automatic repeat request (HARQ) feedback associated with the sidelink communication in each PSFCH transmission occasion of the plurality of PSFCH transmission occasions, the HARQ feedback associated with the sidelink communication in each PSFCH transmission occasion of the plurality of PSFCH transmission occasions.

Aspect 2: The method of Aspect 1, wherein the PSFCH information indicates that the responding UE is to transmit the HARQ feedback in each transmission occasion of the plurality of PSFCH transmission occasions.

Aspect 3: The method of any of Aspects 1-2, wherein the plurality of PSFCH transmission occasions correspond to all PSFCH transmission occasions within a channel occupancy time for communicating with the responding UE.

Aspect 4: The method of any of Aspects 1-3, further comprising receiving, from the responding UE, the HARQ feedback in each PSFCH transmission occasion of the plurality of PSFCH transmission occasions.

Aspect 5: A method of wireless communication performed at an initiating user equipment (UE), comprising: obtaining physical sidelink feedback channel (PSFCH) information that indicates a plurality of PSFCH transmission occasions; transmitting, to a responding UE, a sidelink communication; and receiving, in accordance with the PSFCH information indicating that the responding UE is to transmit hybrid automatic repeat request (HARQ) feedback associated with the sidelink communication in at least a first PSFCH transmission occasion of the plurality of PSFCH transmission occasions, the HARQ feedback associated with the sidelink communication in at least the first PSFCH transmission occasion of the plurality of PSFCH transmission occasions.

Aspect 6: The method of Aspect 5, wherein the PSFCH information indicates that the responding UE is to transmit HARQ feedback in a PSFCH transmission occasion of the plurality of PSFCH transmission occasions in accordance with the responding UE failing to transmit HARQ feedback in a previous PSFCH transmission occasion due to a listen-before-talk failure.

Aspect 7: The method of any of Aspects 5-6, further comprising identifying, in accordance with the PSFCH information, that the responding UE is not to transmit HARQ feedback in all subsequent PSFCH transmission occasions of the plurality of PSFCH transmission occasions that are after the first PSFCH transmission occasion.

Aspect 8: The method of any of Aspects 5-7, further comprising identifying, in accordance with the PSFCH information, that the responding UE is to transmit HARQ feedback in one or more subsequent PSFCH transmission occasions that are after the first PSFCH transmission occasion and that are prior to a second PSFCH transmission occasion in which the initiating UE receives a target HARQ feedback from the responding UE.

Aspect 9: The method of Aspect 8, further comprising identifying, in accordance with receiving the target HARQ feedback from the responding UE in the second PSFCH transmission occasion, that the responding UE is not to transmit HARQ feedback in all subsequent PSFCH transmission occasions of the plurality of PSFCH transmission occasions that are after the second PSFCH transmission occasion.

Aspect 10: The method of any of Aspects 5-9, further comprising communicating one or more padding signals in accordance with identifying that the responding UE is not to transmit HARQ feedback in one or more subsequent PSFCH transmission occasions that are after the first PSFCH transmission occasion.

Aspect 11: The method of Aspect 10, wherein communicating the one or more padding signals comprises transmitting, to the responding UE, one or more padding signals corresponding to the one or more subsequent PSFCH transmission occasions that are after the first PSFCH transmission occasion.

Aspect 12: The method of Aspect 11, wherein transmitting the one or more padding signals corresponding to the one or more subsequent PSFCH transmission occasions that are after the first PSFCH transmission occasion comprises transmitting the one or more padding signals in at least one of a common interlace, a reserved PSFCH resource, or an unused PSFCH resource.

Aspect 13: The method of Aspect 10, wherein communicating the one or more padding signals comprises transmitting, to the responding UE, a padding signal indication that indicates for the responding UE to transmit the one or more padding signals to the initiating UE.

Aspect 14: The method of Aspect 13, wherein transmitting the padding signal indication comprises transmitting, to the responding UE, an indication for the responding UE to transmit one or more padding signals corresponding to all subsequent PSFCH transmission occasions that are after the first PSFCH transmission occasion.

Aspect 15: The method of Aspect 13, wherein transmitting the padding signal indication comprises transmitting, to the responding UE, an indication for the responding UE to transmit the one or more padding signals in accordance with sidelink control information.

Aspect 16: The method of Aspect 15, further comprising transmitting, to the responding UE, sidelink control information that indicates whether the responding UE is to transmit one or more padding signals corresponding to one or more subsequent PSFCH transmission occasions that are after the first PSFCH transmission occasion.

Aspect 17: The method of Aspect 16, wherein transmitting the sidelink control information that indicates whether the responding UE is to transmit the one or more padding signals comprises transmitting sidelink control information that indicates for the responding UE to transmit one or more padding signals corresponding to a subset of the PSFCH transmission occasions that are after the first PSFCH transmission occasion.

Aspect 18: A method of wireless communication performed at a responding user equipment (UE), comprising: obtaining physical sidelink feedback channel (PSFCH) information that indicates for transmission of hybrid automatic repeat request (HARQ) feedback in each PSFCH transmission occasion of a plurality of PSFCH transmission occasions; receiving, from an initiating UE, a sidelink communication; and transmitting, to the initiating UE in accordance with the PSFCH information, HARQ feedback associated with the sidelink communication in each PSFCH transmission occasion of the plurality of PSFCH transmission occasions.

Aspect 19: The method of Aspect 18, wherein the plurality of PSFCH transmission occasions correspond to all PSFCH transmission occasions within a channel occupancy time for communicating with the initiating UE.

Aspect 20: A method of wireless communication performed at a responding user equipment (UE), comprising: obtaining physical sidelink feedback channel (PSFCH) information that indicates for transmission of hybrid automatic repeat request (HARQ) feedback in at least a first PSFCH transmission occasion of a plurality of PSFCH transmission occasions; receiving, from an initiating UE, a sidelink communication; and transmitting, to the initiating UE in accordance with the PSFCH information, HARQ feedback associated with the sidelink communication in at least the first PSFCH transmission occasion of the plurality of PSFCH transmission occasions.

Aspect 21: The method of Aspect 20, wherein transmitting the HARQ feedback in at least the first PSFCH transmission occasion comprises transmitting the HARQ feedback in at least the first PSFCH transmission occasion in accordance with failing to transmit HARQ feedback in a previous PSFCH transmission occasion due to a listen-before-talk failure.

Aspect 22: The method of any of Aspects 20-21, further comprising receiving, from the initiating UE, an indication not to transmit HARQ feedback in all subsequent PSFCH transmission occasions of the plurality of PSFCH transmission occasions that are after the first PSFCH transmission occasion.

Aspect 23: The method of any of Aspects 20-22, further comprising receiving, from the initiating UE, an indication to transmit HARQ feedback in one or more subsequent PSFCH transmission occasions that are after the first PSFCH transmission occasion and that are prior to a second PSFCH transmission occasion that is used by the responding UE for transmitting a target HARQ feedback.

Aspect 24: The method of Aspect 23, further comprising receiving, from the initiating UE, after transmitting the target HARQ feedback, an indication not to transmit HARQ feedback in all subsequent PSFCH transmission occasions of the plurality of PSFCH transmission occasions that are after the second PSFCH transmission occasion.

Aspect 25: The method of any of Aspects 20-24, further comprising receiving, from the initiating UE, one or more padding signals corresponding to one or more subsequent PSFCH transmission occasions that are after the first PSFCH transmission occasion.

Aspect 26: The method of Aspect 25, wherein receiving the one or more padding signals corresponding to the one or more subsequent PSFCH transmission occasions that are after the first PSFCH transmission occasion comprises receiving the one or more padding signals in at least one of a common interlace, a reserved PSFCH resource, or an unused PSFCH resource.

Aspect 27: The method of any of Aspects 20-26, further comprising receiving, from the initiating UE, a padding signal indication that indicates for the responding UE to transmit one or more padding signals to the initiating UE.

Aspect 28: The method of Aspect 27, wherein receiving the padding signal indication comprises receiving, from the initiating UE, an indication to transmit one or more padding signals corresponding to all subsequent PSFCH transmission occasions that are after the first PSFCH transmission occasion.

Aspect 29: The method of Aspect 27, wherein receiving the padding signal indication comprises receiving, from the initiating UE, an indication to transmit the one or more padding signals in accordance with sidelink control information.

Aspect 30: The method of Aspect 29, further comprising receiving, from the initiating UE, sidelink control information that indicates whether the responding UE is to transmit one or more padding signals corresponding to one or more subsequent PSFCH transmission occasions that are after the first PSFCH transmission occasion.

Aspect 31: The method of Aspect 30, wherein receiving the sidelink control information that indicates whether the responding UE is to transmit the one or more padding signals comprises receiving sidelink control information that indicates for the responding UE to transmit one or more padding signals corresponding to a subset of the PSFCH transmission occasions that are after the first PSFCH transmission occasion.

Aspect 32: An apparatus for wireless communication at a device, comprising a processor; memory coupled with the processor; and instructions stored in the memory and executable by the processor to cause the apparatus to perform the method of one or more of Aspects 1-31.

Aspect 33: A device for wireless communication, comprising a memory and one or more processors coupled to the memory, the one or more processors configured to perform the method of one or more of Aspects 1-31.

Aspect 34: An apparatus for wireless communication, comprising at least one means for performing the method of one or more of Aspects 1-31.

Aspect 35: A non-transitory computer-readable medium storing code for wireless communication, the code comprising instructions executable by a processor to perform the method of one or more of Aspects 1-31.

Aspect 36: A non-transitory computer-readable medium storing a set of instructions for wireless communication, the set of instructions comprising one or more instructions that, when executed by one or more processors of a device, cause the device to perform the method of one or more of Aspects 1-31.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. An initiating user equipment (UE) for wireless communication, comprising:

one or more memories storing processor-readable code; and one or more processors coupled with the one or more memories, at least one processor of the one or more processors configured to cause the initiating UE to:

obtain physical sidelink feedback channel (PSFCH) information that indicates a plurality of PSFCH transmission occasions;

transmit, to a responding UE, a sidelink communication;

transmit, to the responding UE, a padding signal indication that indicates for the responding UE to transmit one or more padding signals to the initiating UE;

receive, in accordance with the PSFCH information indicating that the responding UE is to transmit hybrid automatic repeat request (HARQ) feedback associated with the sidelink communication in at least a first PSFCH transmission occasion of the plurality of PSFCH transmission occasions, the HARQ feedback associated with the sidelink communication in at least the first PSFCH transmission occasion of the plurality of PSFCH transmission occasions; and receive the one or more padding signals in one or more subsequent PSFCH transmission occasions that are after the first PSFCH transmission occasion in accordance with the padding signal indication.

2. The initiating UE of claim 1, wherein the PSFCH information indicates that the responding UE is to transmit HARQ feedback in a PSFCH transmission occasion of the plurality of PSFCH transmission occasions in accordance with the responding UE failing to transmit HARQ feedback in a previous PSFCH transmission occasion due to a listen-before-talk failure.

3. The initiating UE of claim 1, wherein the at least one processor is configured to cause the initiating UE to identify, in accordance with the PSFCH information, that the responding UE is not to transmit HARQ feedback in all subsequent PSFCH transmission occasions of the plurality of PSFCH transmission occasions that are after the first PSFCH transmission occasion.

4. The initiating UE of claim 1, wherein the at least one processor is configured to cause the initiating UE to identify, in accordance with the PSFCH information, that the responding UE is to transmit HARQ feedback in one or more subsequent PSFCH transmission occasions that are after the first PSFCH transmission occasion and that are prior to a second PSFCH transmission occasion in which the initiating UE receives a target HARQ feedback from the responding UE.

5. The initiating UE of claim 4, wherein the at least one processor is configured to cause the initiating UE to identify, in accordance with receiving the target HARQ feedback from the responding UE in the second PSFCH transmission occasion, that the responding UE is not to transmit HARQ feedback in all subsequent PSFCH transmission occasions of the plurality of PSFCH transmission occasions that are after the second PSFCH transmission occasion.

6. The initiating UE of claim 1, wherein the at least one processor is configured to cause the initiating UE to receive the one or more padding signals in accordance with identifying that the responding UE is not to transmit HARQ feedback in the one or more subsequent PSFCH transmission occasions that are after the first PSFCH transmission occasion.

7. The initiating UE of claim 6, wherein, to cause the initiating UE to receive the one or more padding signals, the at least one processor is configured to cause the initiating UE to transmit, to the responding UE, the one or more padding signals corresponding to the one or more subsequent PSFCH transmission occasions that are after the first PSFCH transmission occasion.

8. The initiating UE of claim 7, wherein, to cause the initiating UE to transmit the one or more padding signals corresponding to the one or more subsequent PSFCH transmission occasions that are after the first PSFCH transmission occasion, the at least one processor is configured to cause the initiating UE to transmit the one or more padding signals in at least one of a common interlace, a reserved PSFCH resource, or an unused PSFCH resource.

9. The initiating UE of claim 6, wherein, to cause the initiating UE to transmit the padding signal indication, the at least one processor is configured to cause the initiating UE to transmit, to the responding UE, an indication for the responding UE to transmit the one or more padding signals corresponding to all subsequent PSFCH transmission occasions that are after the first PSFCH transmission occasion.

10. The initiating UE of claim 6, wherein, to cause the initiating UE to transmit the padding signal indication, the at least one processor is configured to cause the initiating UE to transmit, to the responding UE, an indication for the responding UE to transmit the one or more padding signals in accordance with sidelink control information.

11. The initiating UE of claim 10, wherein the at least one processor is configured to cause the initiating UE to transmit, to the responding UE, sidelink control information that indicates whether the responding UE is to transmit the one or more padding signals corresponding to one or more subsequent PSFCH transmission occasions that are after the first PSFCH transmission occasion.

12. The initiating UE of claim 11, wherein, to cause the initiating UE to transmit the sidelink control information that indicates whether the responding UE is to transmit the one or more padding signals, the at least one processor is configured to cause the initiating UE to transmit sidelink control information that indicates for the responding UE to transmit the one or more padding signals corresponding to a subset of the PSFCH transmission occasions that are after the first PSFCH transmission occasion.

13. A responding user equipment (UE) for wireless communication, comprising:

one or more memories storing processor-readable code; and one or more processors coupled with the one or more memories, at least one processor of the one or more processors configured to cause the responding UE to:

obtain physical sidelink feedback channel (PSFCH) information that indicates for transmission of hybrid automatic repeat request (HARQ) feedback in at least a first PSFCH transmission occasion of a plurality of PSFCH transmission occasions;

receive, from an initiating UE, a sidelink communication;

receive, from the initiating UE, a padding signal indication that indicates for the responding UE to transmit one or more padding signals to the initiating UE;

transmit, to the initiating UE in accordance with the PSFCH information, HARQ feedback associated with the sidelink communication in at least the first PSFCH transmission occasion of the plurality of PSFCH transmission occasions; and transmit the one or more padding signals in one or more subsequent PSFCH transmission occasions that are after the first PSFCH transmission occasion in accordance with the padding signal indication.

14. The responding UE of claim 13, wherein, to cause the responding UE to transmit HARQ feedback in at least the first PSFCH transmission occasion, the at least one processor is configured to cause the responding UE to transmit the HARQ feedback in at least the first PSFCH transmission occasion in accordance with failing to transmit HARQ feedback in a previous PSFCH transmission occasion due to a listen-before-talk failure.

15. The responding UE of claim 13, wherein the at least one processor is configured to cause the responding UE to receive, from the initiating UE, an indication not to transmit HARQ feedback in all subsequent PSFCH transmission occasions of the plurality of PSFCH transmission occasions that are after the first PSFCH transmission occasion.

16. The responding UE of claim 13, wherein the at least one processor is configured to cause the responding UE to receive, from the initiating UE, an indication to transmit HARQ feedback in one or more subsequent PSFCH transmission occasions that are after the first PSFCH transmission occasion and that are prior to a second PSFCH transmission occasion that is used by the responding UE for transmitting a target HARQ feedback.

17. The responding UE of claim 16, wherein the at least one processor is configured to cause the responding UE to receive, from the initiating UE, after transmitting the target HARQ feedback, an indication not to transmit HARQ feedback in all subsequent PSFCH transmission occasions of the plurality of PSFCH transmission occasions that are after the second PSFCH transmission occasion.

18. The responding UE of claim 13, wherein the at least one processor is configured to cause the responding UE to receive, from the initiating UE, the one or more padding signals corresponding to one or more subsequent PSFCH transmission occasions that are after the first PSFCH transmission occasion.

19. The responding UE of claim 18, wherein, to cause the responding UE to receive the one or more padding signals corresponding to the one or more subsequent PSFCH transmission occasions that are after the first PSFCH transmission occasion, the at least one processor is configured to cause the responding UE to receive the one or more padding signals in at least one of a common interlace, a reserved PSFCH resource, or an unused PSFCH resource.

20. The responding UE of claim 13, wherein, to cause the responding UE to receive the padding signal indication, the at least one processor is configured to cause the responding UE to receive, from the initiating UE, an indication to transmit the one or more padding signals corresponding to all subsequent PSFCH transmission occasions that are after the first PSFCH transmission occasion.

21. The responding UE of claim 13, wherein, to cause the responding UE to receive the padding signal indication, the at least one processor is configured to cause the responding UE to receive, from the initiating UE, an indication to transmit the one or more padding signals in accordance with sidelink control information.

22. The responding UE of claim 21, wherein the at least one processor is configured to cause the responding UE to receive, from the initiating UE, sidelink control information that indicates whether the responding UE is to transmit the one or more padding signals corresponding to one or more subsequent PSFCH transmission occasions that are after the first PSFCH transmission occasion.

23. A method for wireless communication at an initiating user equipment (UE), comprising:

obtaining physical sidelink feedback channel (PSFCH) information that indicates a plurality of PSFCH transmission occasions;

transmitting, to a responding UE, a sidelink communication;

transmitting, to the responding UE, a padding signal indication that indicates for the responding UE to transmit one or more padding signals to the initiating UE;

receiving, in accordance with the PSFCH information indicating that the responding UE is to transmit hybrid automatic repeat request (HARQ) feedback associated with the sidelink communication in at least a first PSFCH transmission occasion of the plurality of PSFCH transmission occasions, the HARQ feedback associated with the sidelink communication in at least the first PSFCH transmission occasion of the plurality of PSFCH transmission occasions; and receiving the one or more padding signals in one or more subsequent PSFCH transmission occasions that are after the first PSFCH transmission occasion in accordance with the padding signal indication.

24. The method of claim 23, wherein the PSFCH information indicates that the responding UE is to transmit HARQ feedback in a PSFCH transmission occasion of the plurality of PSFCH transmission occasions in accordance with the responding UE failing to transmit HARQ feedback in a previous PSFCH transmission occasion due to a listen-before-talk failure.

25. The method of claim 23, further comprising:

identifying, in accordance with the PSFCH information, that the responding UE is not to transmit HARQ feedback in all subsequent PSFCH transmission occasions of the plurality of PSFCH transmission occasions that are after the first PSFCH transmission occasion.

26. The method of claim 23, further comprising:

transmitting, to the responding UE, an indication for the responding UE to transmit the one or more padding signals corresponding to all subsequent PSFCH transmission occasions that are after the first PSFCH transmission occasion.

27. The method of claim 23, further comprising:

transmitting, to the responding UE, an indication for the responding UE to transmit the one or more padding signals in accordance with sidelink control information.

28. A method for wireless communication at a responding user equipment (UE), comprising:

obtaining physical sidelink feedback channel (PSFCH) information that indicates for transmission of hybrid automatic repeat request (HARQ) feedback in at least a first PSFCH transmission occasion of a plurality of PSFCH transmission occasions;

receiving, from an initiating UE, a sidelink communication;

receiving, from the initiating UE, a padding signal indication that indicates for the responding UE to transmit one or more padding signals to the initiating UE;

transmitting, to the initiating UE in accordance with the PSFCH information, HARQ feedback associated with the sidelink communication in at least the first PSFCH transmission occasion of the plurality of PSFCH transmission occasions; and transmitting the one or more padding signals in one or more subsequent PSFCH transmission occasions that are after the first PSFCH transmission occasion in accordance with the padding signal indication.

29. The method of claim 28, wherein causing the responding UE to transmit HARQ feedback in at least the first PSFCH transmission occasion further comprises:

transmitting the HARQ feedback in at least the first PSFCH transmission occasion in accordance with failing to transmit HARQ feedback in a previous PSFCH transmission occasion due to a listen-before-talk failure.

30. The method of claim 28, further comprising:

receiving, from the initiating UE, an indication not to transmit HARQ feedback in all subsequent PSFCH transmission occasions of the plurality of PSFCH transmission occasions that are after the first PSFCH transmission occasion.

* * * * *